(12) United States Patent
Singh

(10) Patent No.: US 11,790,103 B2
(45) Date of Patent: Oct. 17, 2023

(54) ADAPTIVE DATA LOSS PREVENTION

(71) Applicant: Citrix Systems, Inc., Fort Lauderdale, FL (US)

(72) Inventor: Manbinder Pal Singh, Coral Springs, FL (US)

(*) Notice: Subject to any disclaimer, the term of this patent is extended or adjusted under 35 U.S.C. 154(b) by 34 days.

(21) Appl. No.: 17/036,338

(22) Filed: Sep. 29, 2020

(65) Prior Publication Data

US 2022/0100885 A1 Mar. 31, 2022

(51) Int. Cl.
*G06F 21/62* (2013.01)
*G06F 16/957* (2019.01)

(52) U.S. Cl.
CPC ...... *G06F 21/6227* (2013.01); *G06F 16/9577* (2019.01)

(58) Field of Classification Search
CPC ... G06F 21/6227; G06F 21/60; G06F 16/9577
See application file for complete search history.

(56) References Cited

U.S. PATENT DOCUMENTS

| | | | | |
|---|---|---|---|---|
| 8,826,443 B1* | 9/2014 | Raman | ................ | G06F 21/6245 726/26 |
| 9,654,510 B1* | 5/2017 | Pillai | ................... | H04L 63/1416 |
| 10,346,634 B2* | 7/2019 | Peterson | ............ | G06F 21/6245 |
| 2008/0118150 A1* | 5/2008 | Balakrishnan | ...... | G06F 21/6254 382/176 |
| 2014/0007222 A1* | 1/2014 | Qureshi | .................. | H04L 67/10 726/16 |
| 2014/0020045 A1* | 1/2014 | Kabat | ..................... | G06F 21/60 726/1 |
| 2014/0150114 A1* | 5/2014 | Sinha | ..................... | G06F 21/62 726/28 |
| 2016/0330236 A1 | 11/2016 | Reddy et al. | | |
| 2017/0006057 A1* | 1/2017 | Perez Lafuente | ....... | H04L 67/34 |
| 2017/0155622 A1* | 6/2017 | Vazquez Carames | .. | H04L 63/20 |
| 2018/0276393 A1* | 9/2018 | Allen | .................... | G06F 21/602 |
| 2019/0108419 A1* | 4/2019 | Coven | ..................... | G06F 8/60 |
| 2019/0268379 A1 | 8/2019 | Narayanaswamy et al. | | |
| 2021/0126926 A1* | 4/2021 | Kaidi | ...................... | H04L 43/08 |
| 2022/0269812 A1* | 8/2022 | Baez | ..................... | H04L 51/212 |

OTHER PUBLICATIONS

International Search Report and Written Opinion on PCT Appl. No. PCT/US2021/048636 dated Dec. 20, 2021.

* cited by examiner

*Primary Examiner* — Scott T Baderman
*Assistant Examiner* — Mario M Velez-Lopez

(57) ABSTRACT

Described embodiments provide systems and methods for adaptive data loss prevention. A first computing device may generate, according to a first response from a server and an output from a second computing device identifying sensitive data in the first response, at least one rule regarding the sensitive data, and at least one template for data loss prevention (DLP) responses. The first computing device may determine, according to the at least one rule, a match to a second response from the server, that includes the sensitive data. The first computing device may provide, according to the match and the at least one template, a DLP response to redact the sensitive data of the second response, in place of a DLP output from the second computing device identifying the sensitive data in the second response.

20 Claims, 16 Drawing Sheets

ADAPTIVE DATA LOSS PREVENTION

FIELD OF THE DISCLOSURE

The present application generally relates to computing systems and environments. In particular, the present application relates to systems and methods for adaptive data loss prevention.

BACKGROUND

Data may be stored and maintained in a computing environment. A data loss prevention (DLP) application may detect potential or actual exfiltration of data from the computing environment.

BRIEF SUMMARY

A computing environment (e.g., an enterprise) may store and maintain various data (e.g., in the form of one or more files). A data loss prevention (DLP) service may be used to assess a level of risk in an attempt to access the data. When a query to access the data (e.g., read or write), a computing device of the environment may send a request to determine the level of risk to the DLP service. The DLP service may calculate the level of risk based on various factors. In accordance with the level of risk and security policies, the DLP service may permit or restrict the attempt to access the data. While such a platform may be used to evaluate the risk and control access to various data in the computing environment, there may be several technical challenges in fully utilizing the capabilities of the DLP service.

For one, when the DLP service (e.g., residing on the cloud) is down or otherwise inaccessible, the transactions to access the data may be entirely blocked (e.g., fail closed) harming operations of environment or wholly allowed (e.g., fail open) risking disclosure of sensitive data that would have been otherwise blocked. Since the environment may have been configured to restrict any access to data without permission by the DLP service, the unavailability of the DLP service may also result in the complete stoppage of operations of environment. For another, even when the DLP service is available, each request may consume a large amount of computing and networking resources, and the costs of processing may become significant over time. For example, with a Software as a Service (SaaS) application, a user accessing personal information to retrieve an identifier (e.g., an employee identifier) may lead to the creation of the same or otherwise duplicative web and DLP responses. In addition, a personal information page for a first user and a second user may have similar format but with different values. In this scenario, the DLP response for both users may also be of similar format, with fields for a name, a phone number, and a user ID, among others. For an enterprise with over several thousand users and each user accessing the information page once a month, the number of DLP calls may also be in the several of thousands which can consume vast resources and significantly increase operating costs. Not to mention, the processing of the requests at the DLP service may lead to a reduction in performance due to overhead for each request.

To account for these and other technical problems, a gateway can be configured to provide an adaptor engine to leverage the outputs of the DLP service to create rules and templates in the form of structured documents (e.g., Hypertext Markup Language (HTML) and Extensible Markup Language (XML)) to replicate DLP decisions on the gateway. Using the structured document, the adaptor engine of the gateway may efficiently mask multiple web responses of similar structure from servers. To that end, the adaptor engine may process a web response from a server and an output response from the DLP service to generate and maintain a set of DLP matching rules and DLP response template (e.g., in the form of JavaScript Object Notation (JSON)). In generating these, the adaptor engine may convert the data identified by the DLP service into a programmatically identifiable element (e.g., a document object model (DOM) element of a webpage).

For new requests or in case of an outage at the DLP service, the adaptor on the gateway may receive a web response from a server as an input and find data that matches one of stored DLP matching rules. To determine a match, the adaptor engine may check the data against the DLP rules. The rules may be based on any number of factors, such as: identifiable user interface element identification identifying an identifiable user interface element in the DOM based on identifier, class attributes, structure, and hierarchy; relative location values converted from absolute location values with respect to each identifiable user interface element; a value for a prefix or a suffix of the identified text or location in the identifiable user interface element; a type and a number of characters in identified sensitive content; and common values in label types (e.g., city name, phone number, email address, and other keywords).

When a match is found, the adaptor may use the DLP response template from storage to create a new web response to output. The new response may be derived from the web response and the DLP response by masking identified data and replacing the identified portions with placeholders. The placeholder may correspond or map to the DLP response template. The output template may be created for subsequent responses where the masked or placeholder data can be replaced with values from the new web responses.

In this manner, once DLP rules have been cached, the rules can be repeated/applied to subsequent transactions, even when the DLP service is down (or up). The integration of the DLP rules may reduce or even eliminate how much sensitive data is exposed during a DLP outage. Furthermore, since dependence on the DLP service may be reduced, the gateway may lessen consumption of computing resources and network bandwidth from invoking the DLP service. In addition, offline masking of content by a trusted client (e.g., the gateway) may improve availability of non-masked data.

At least one aspect of this disclosure is directed to a method of adaptive data loss prevention. A first computing device may generate, according to a first response from a server and an output from a second computing device identifying sensitive data in the first response, at least one rule regarding the sensitive data, and at least one template for data loss prevention (DLP) responses. The first computing device may determine, according to the at least one rule, a match to a second response from the server, that includes the sensitive data. The first computing device may provide, according to the match and the at least one template, a DLP response to redact the sensitive data of the second response, in place of a DLP output from the second computing device identifying the sensitive data in the second response.

In some embodiments, the first computing device may receive the first response from the server hosting a web application to display a page of content. In some embodiments, the first computing device may identify data of the first response that includes the sensitive data. In some embodiments, the first computing device may identify an element displayable on the page in response to the identification of the data of the received first response. The element may be identifiable based on the at least one rule and includes non-sensitive data. In some embodiments, the first computing device may apply the generated element to at least one subsequent response for display of a second page based on the at least one rule. The application of the generated element may be to prevent loss of sensitive data from display of the second page.

In some embodiments, the sensitive data may include a class or type of content. In some embodiments, the first computing device may convert the sensitive data into an identifiable user interface element. The at least one rule may be configured to match with the identifiable user interface element. In some embodiments, the identifiable user interface element may include at least one of: a prefix, a suffix, a label, a length or number of characters of the sensitive data, a type of characters of the sensitive data, or at least one location values. In some embodiments, the DLP response may redact or indicate to redact the sensitive data of the second response, according to the at least one rule.

In some embodiments, the first computing device may determine, according to a first rule of the at least one rule, a complete match with a first data in the second response. In some embodiments, the first computing device may determine, according to a second rule of the at least one rule, a complete match with a second data in the second response. In some embodiments, the first computing device may provide, according to the complete match with the first data, the complete match with the second match, and the at least one template, the DLP response to redact the first data and the second data of the second response.

In some embodiments, the first computing device may determine, according to a first rule of the at least one rule, a complete match with a first data in the second response. In some embodiments, the first computing device may determine, according to a second rule of the at least one matching rule, an incomplete match with a second data in the second response. In some embodiments, the first computing device may provide, according to the complete match, the incomplete match and the at least one template, the DLP response to redact the first data and to maintain the second data of the second response.

In some embodiments, the first computing device may identify a first template from the at least one template, that corresponds to the complete match with the first data. In some embodiments, the first computing device may provide, according to the first template, the DLP response to redact the first data and to maintain the second data of the second response.

Another aspect of this disclosure is directed to a device for adaptive data loss prevention. The device may include at least one processor. The at least one processor may generate, according to a first response from a server and an output from a second computing device identifying sensitive data in the first response, at least one rule regarding the sensitive data, and at least one template for data loss prevention (DLP) responses. The at least one processor may determine, according to the at least one rule, a match to a second response from the server, that includes the sensitive data. The at least one processor may provide, according to the match and the at least one template, a DLP response to redact the sensitive data of the second web response, in place of a DLP output from the second computing device identifying the sensitive data in the second response.

In some embodiments, the at least one processor may determine, according to a first rule of the at least one rule, a complete match with a first data in the second response. In some embodiments, the at least one processor may determine, according to a second rule of the at least one rule, an incomplete match with a second data in the second response. In some embodiments, the at least one processor may provide, according to the complete match, the incomplete match and the at least one template, the DLP response to redact the first data and to maintain the second data of the second response.

In some embodiments, the at least one processor may determine, according to a first rule of the at least one rule, a complete match with a first data in the second response. In some embodiments, the at least one processor may determine, according to a second rule of the at least one matching rule, an incomplete match with a second data in the second response. In some embodiments, the at least one processor may provide, according to the complete match, the incomplete match and the at least one template, the DLP response to redact the first data and to maintain the second data of the second response.

In some embodiments, the at least one processor may identify a first template from the at least one template, that corresponds to the complete match with the first data. In some embodiments, the at least one processor may provide, according to the first template, the DLP response to redact the first data and to maintain the second data of the second response.

Another aspect of this disclosure is directed to a non-transitory computer readable medium storing program instructions for causing at least one processor. The instructions may cause the at least one processor to generate, according to a first response from a server and an output from a second computing device identifying sensitive data in the first response, at least one rule regarding the sensitive data, and at least one template for data loss prevention (DLP) responses. The instructions may cause the at least one processor to determine, according to the at least one rule, a match to a second response from the server, that includes the sensitive data. The instructions may cause the at least one processor to provide, according to the match and the at least one template, a DLP response to redact the sensitive data of the second web response, in place of a DLP output from the second computing device identifying the sensitive data in the second response.

In some embodiments, the sensitive data may include a class or type of content. In some embodiments, the first computing device may convert the sensitive data into an identifiable user interface element. The at least one rule may be configured to match with the identifiable user interface element. In some embodiments, the identifiable user interface element may include at least one of: a prefix, a suffix, a label, a length or number of characters of the sensitive data, a type of characters of the sensitive data, or at least one location values. In some embodiments, the DLP response may redact or indicate to redact the sensitive data of the second response, according to the at least one rule.

In some embodiments, the instructions may cause the at least one processor to determine, according to a first rule of the at least one rule, a complete match with a first data in the second response. In some embodiments, the instructions may cause the at least one processor to determine, according to a second rule of the at least one rule, an incomplete match with a second data in the second response. In some embodiments, the instructions may cause the at least one processor to provide, according to the complete match, the incomplete match and the at least one template, the DLP response to redact the first data and to maintain the second data of the second response.

In some embodiments, the instructions may cause the at least one processor to determine, according to a first rule of the at least one rule, a complete match with a first data in the second response. In some embodiments, the instructions may cause the at least one processor to determine, according to a second rule of the at least one matching rule, an incomplete match with a second data in the second response. In some embodiments, the instructions may cause the at least one processor to provide, according to the complete match, the incomplete match and the at least one template, the DLP response to redact the first data and to maintain the second data of the second response.

In some embodiments, the instructions may cause the at least one processor to identify a first template from the at least one template, that corresponds to the complete match with the first data. In some embodiments, the instructions may cause the at least one processor to provide, according to the first template, the DLP response to redact the first data and to maintain the second data of the second response.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
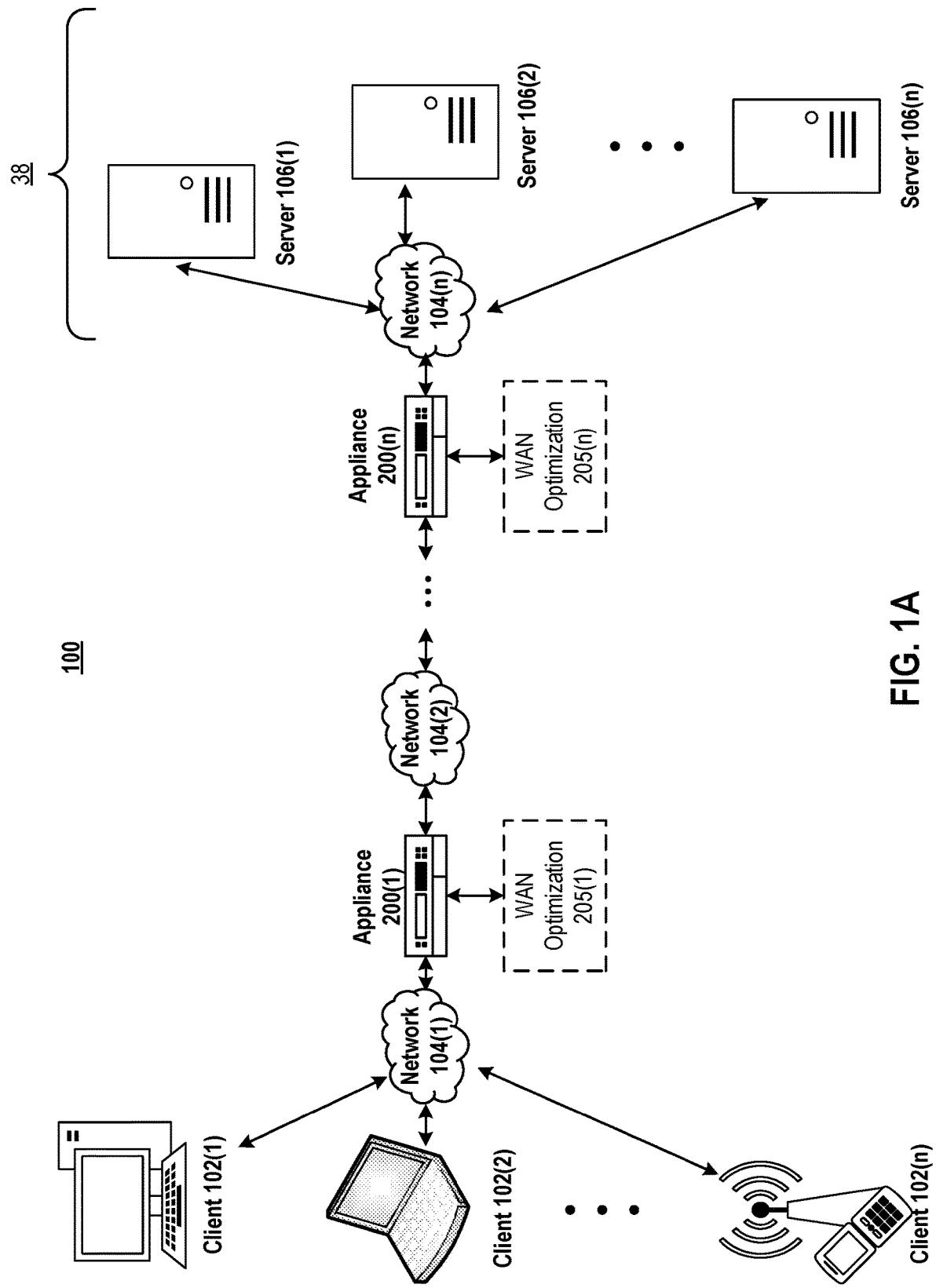
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for adaptive data loss prevention (DLP) using rules and templates for responses.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
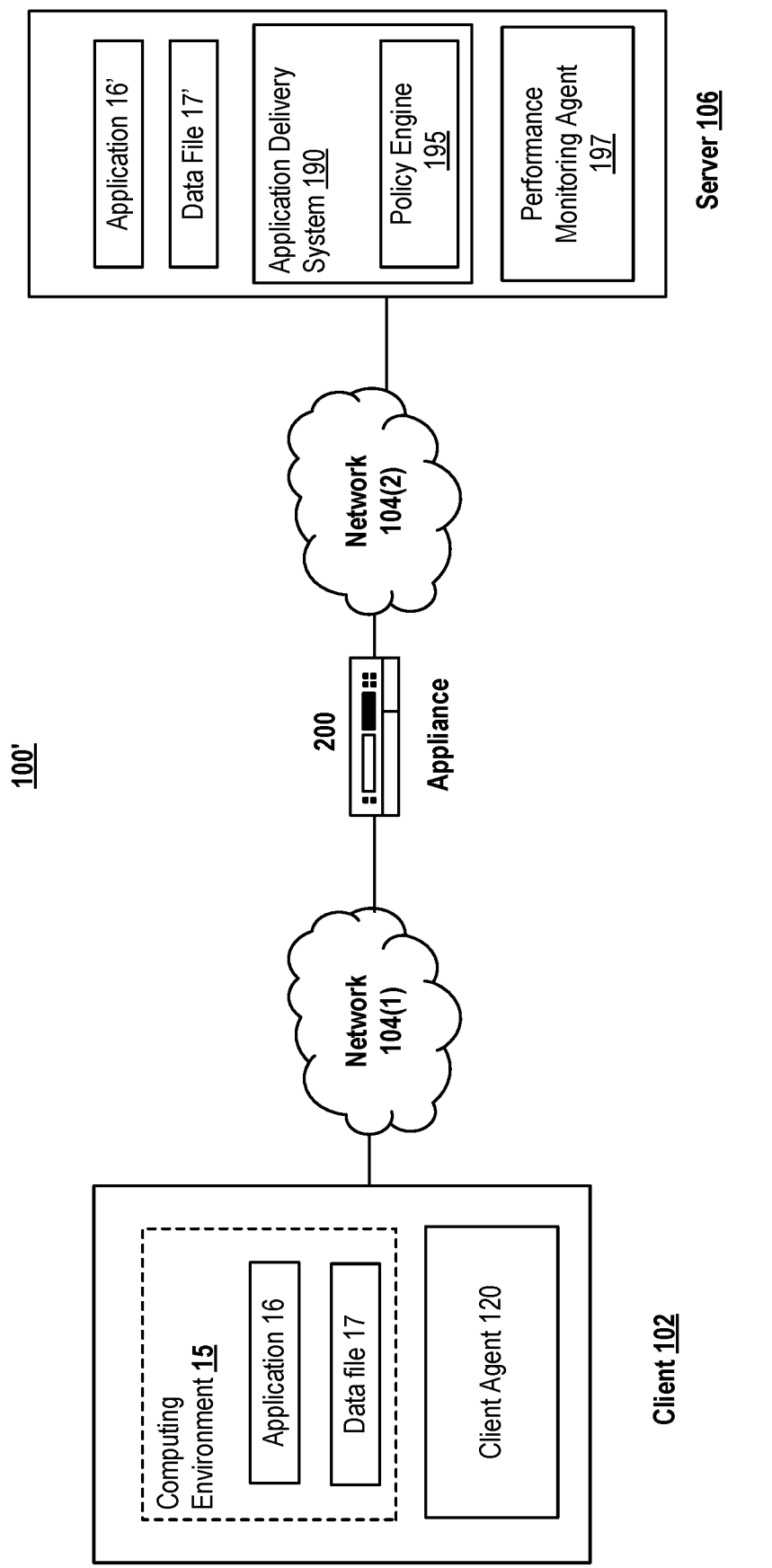
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102

(e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
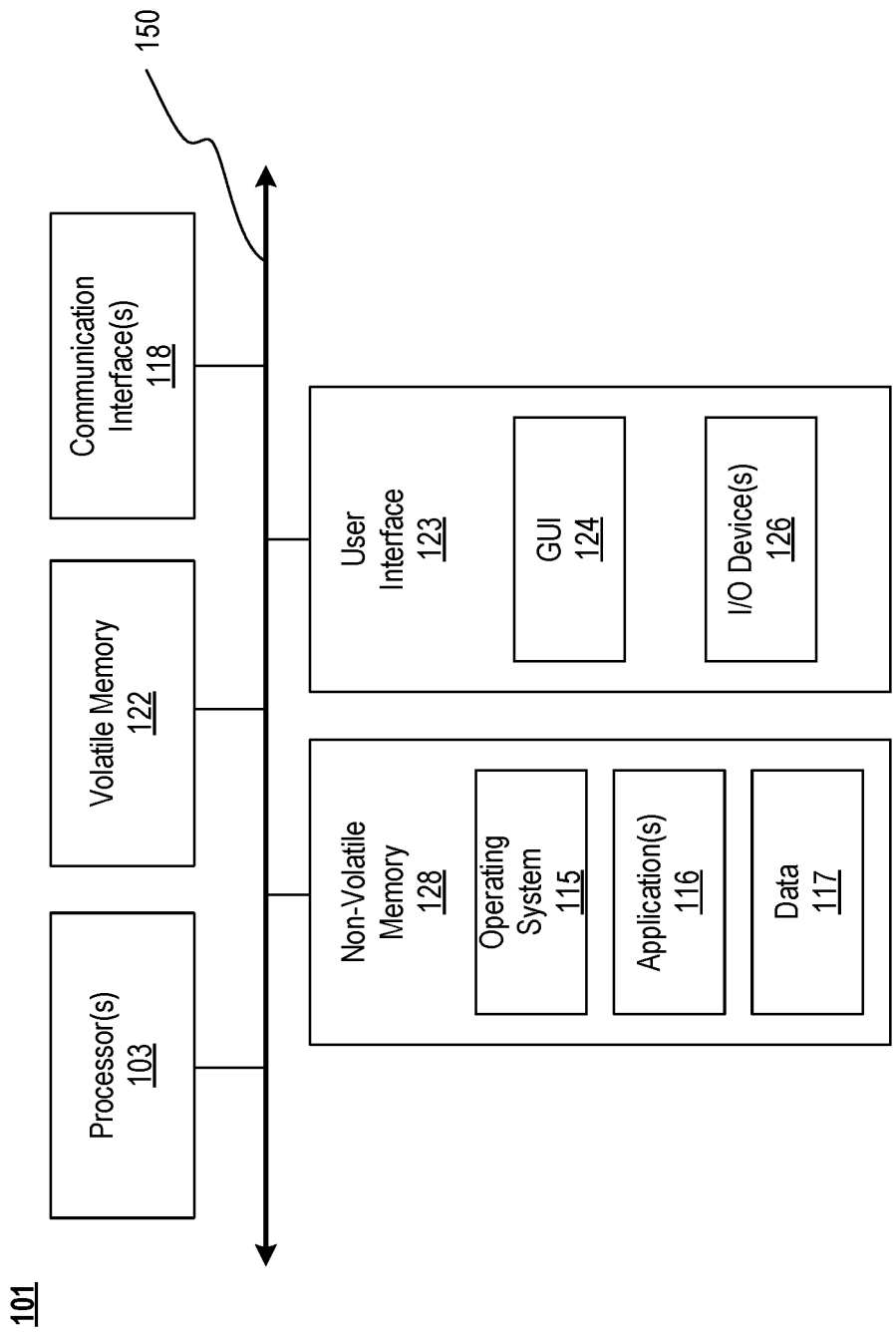
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
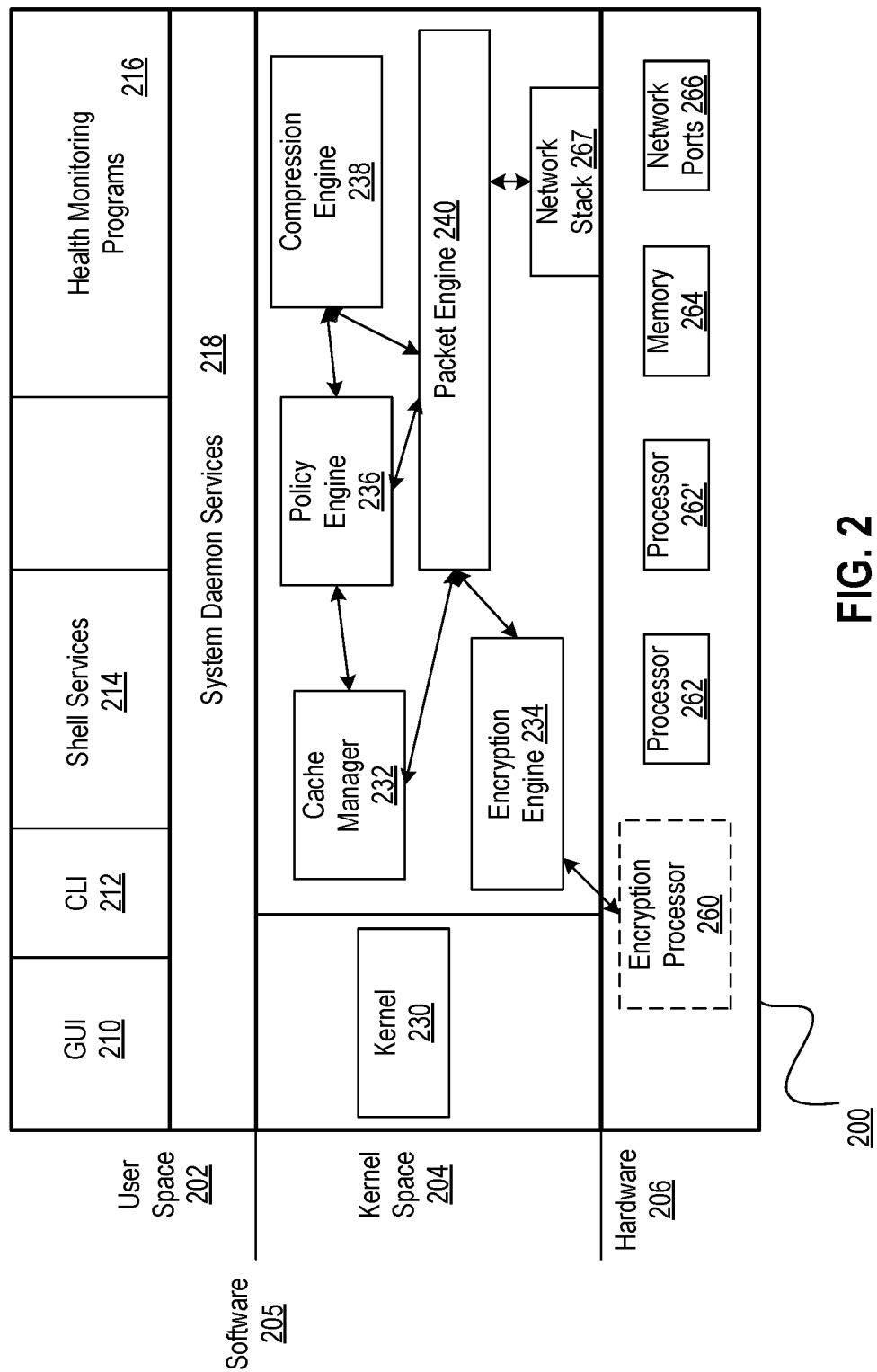
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
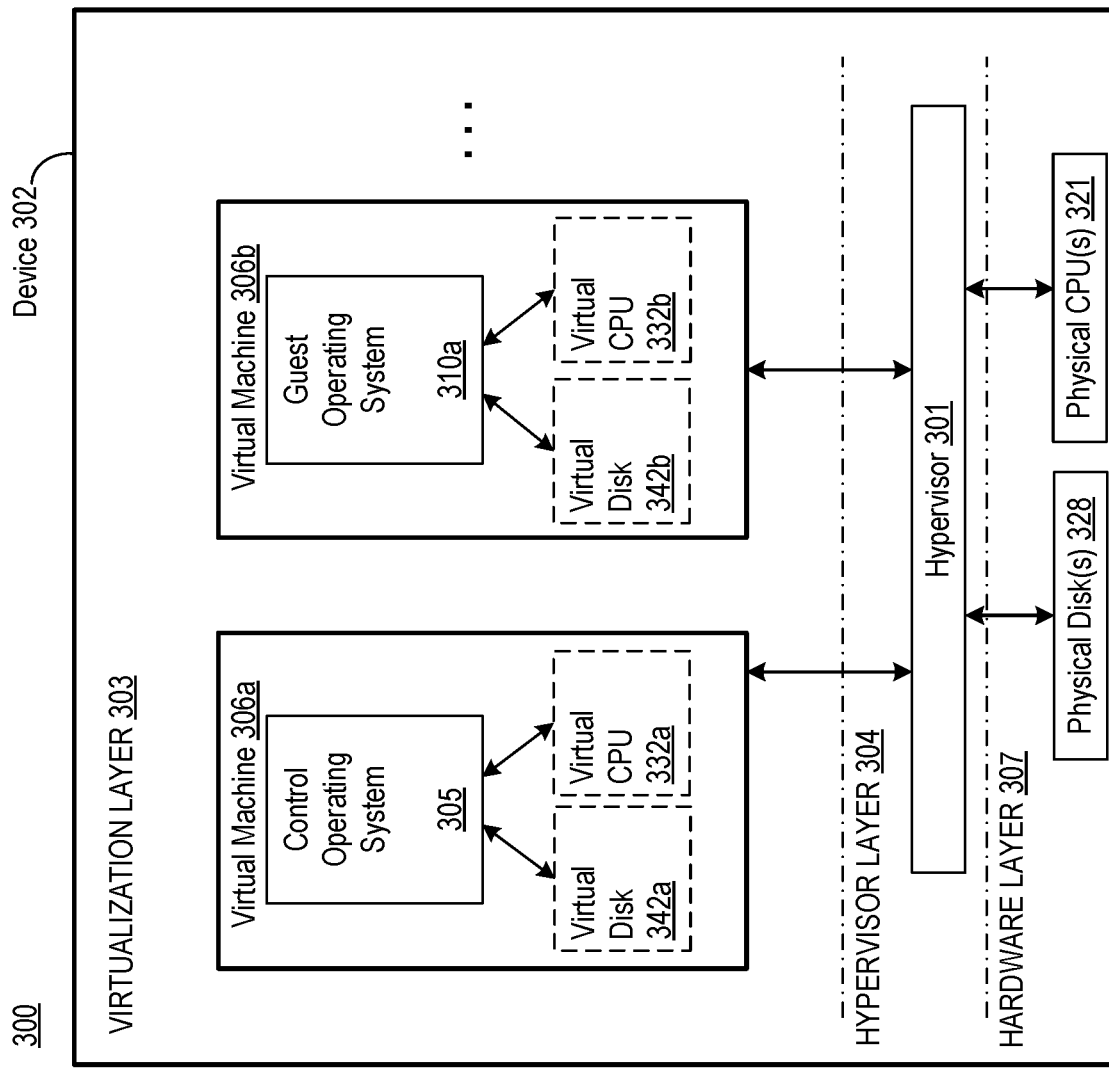
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
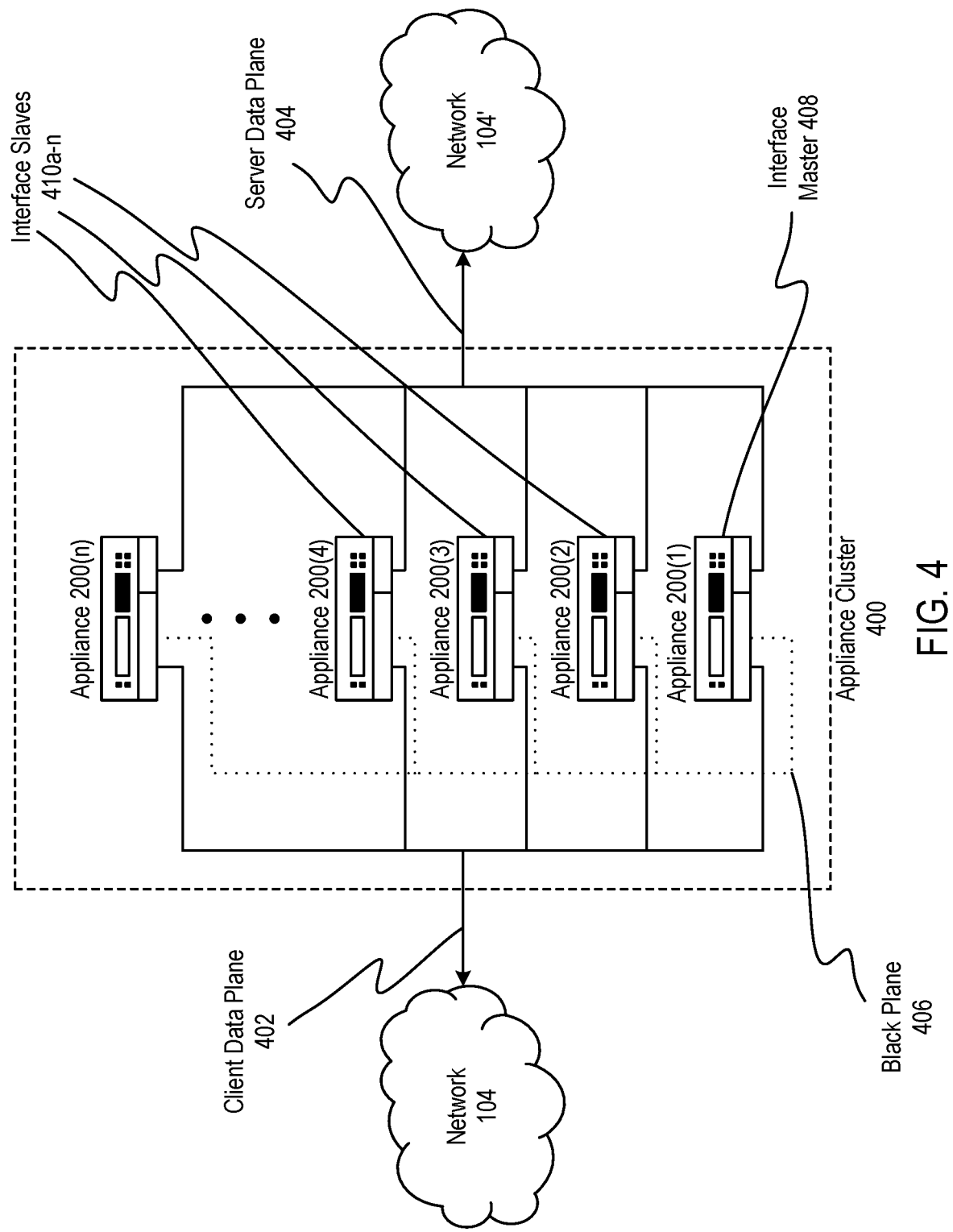
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Figure 5:
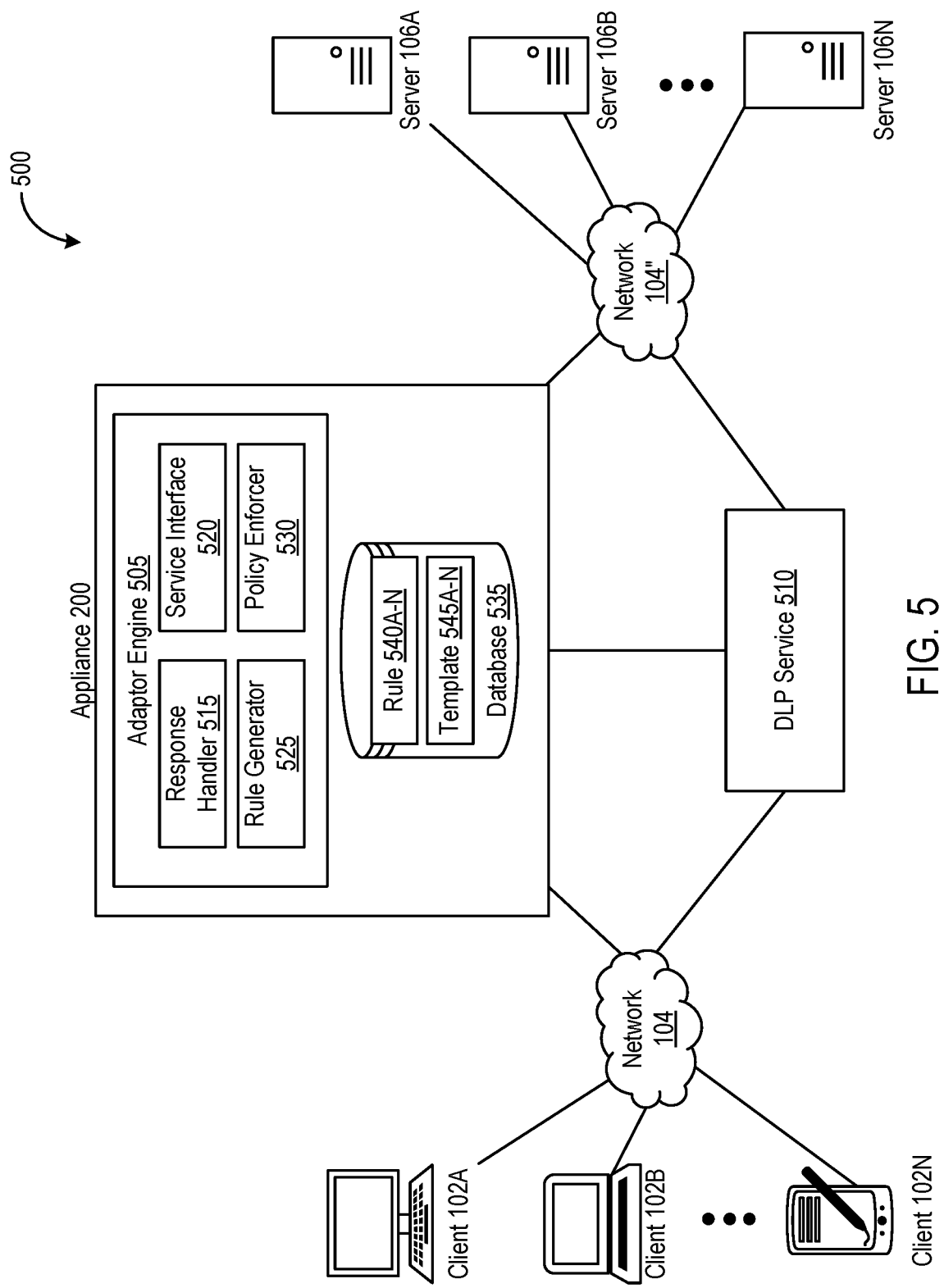
FIG. 5 is a block diagram of an embodiment of a system for adaptive data loss prevention (DLP) using rules and templates for responses in accordance with an illustrative embodiment.

E. Systems and Methods for Adaptive Data Loss Prevention (DLP) Using Rules and Templates for Responses Referring now to FIG. 5, depicted is a system 500 for adaptive data loss prevention (DLP) using rules and templates for responses. In overview, the system 500 may include one or more clients 102 A-N (hereinafter generally referred to as clients 102), one or more servers 106 A-N (hereinafter generally referred to as servers 106), at least one appliance 200 (sometimes herein generally referred to as a first computing device), and at least one data loss prevention (DLP) service 510 (sometimes herein generally referred to as a second computing device), among others. The appliance 200 may include at least one at least one adaptor engine 505 and at least one database 535. The adaptor engine 505 may include at least one response handler 515, at least one service interface 520, at least one rule generator 525, and at least one policy enforcer 530. The database 535 may include a set of rules 540A-N (hereinafter generally referred to as rules 540) and a set of templates 545A-N (hereinafter generally referred to as templates 545).

The systems and methods of the present solution may be implemented in any type and form of device, including clients, servers and/or appliances 200. As referenced herein, a "server" may sometimes refer to any device in a client-server relationship, e.g., an appliance 200 in a handshake with a client device 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

Figure 6A:
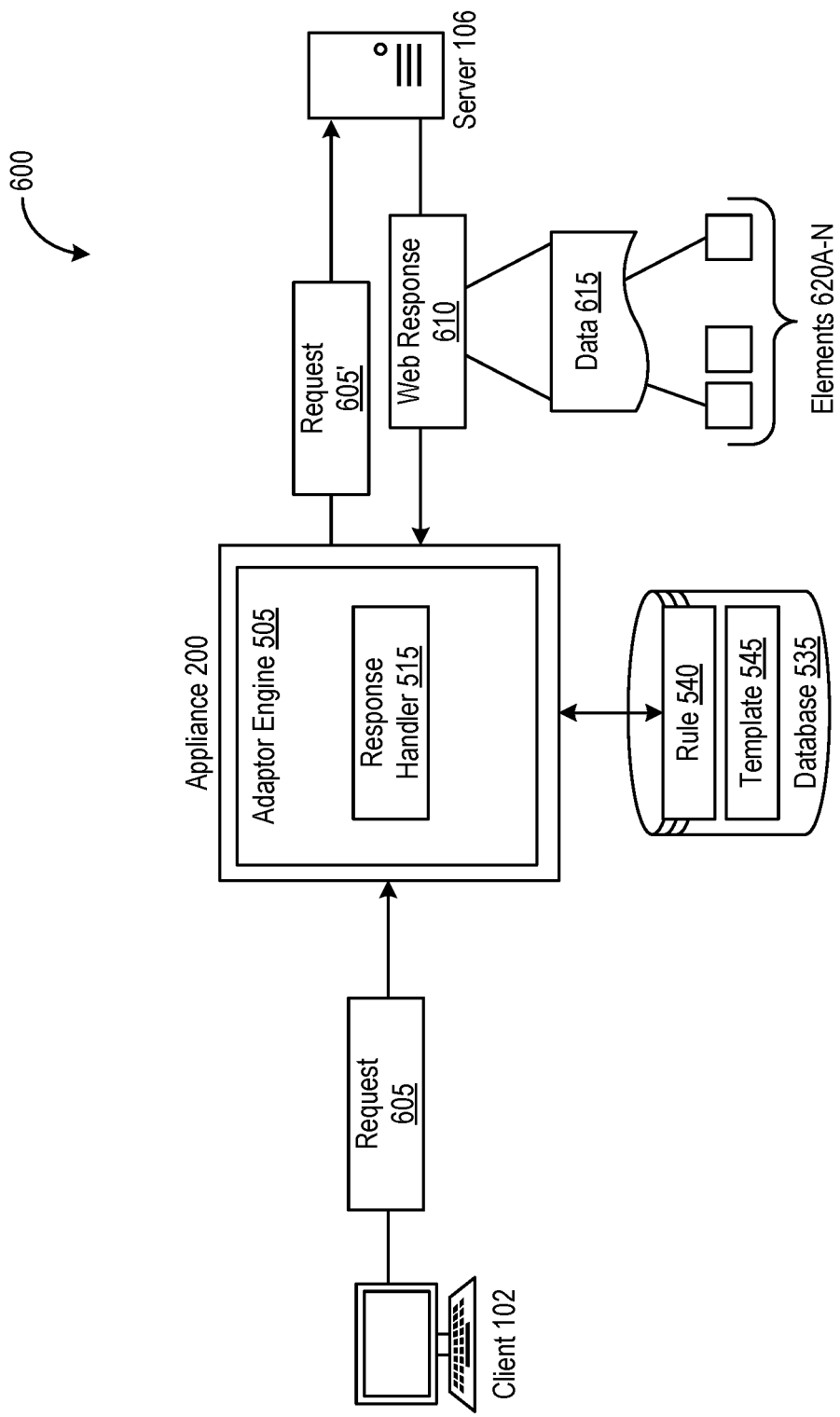
FIG. 6A is a block diagram of a DLP output retrieval process for a system for adaptive data loss prevention (DLP) in accordance with an illustrative embodiment.

Referring now to FIG. 6A, depicted is a block diagram of a DLP output retrieval process 600 for the system 500 for adaptive data loss prevention (DLP). As illustrated, the client 102 may provide, send, or otherwise transmit at least one request 605 to the server 106 via the appliance 200. In some embodiments, the request 605 may be generated in accordance with a communications protocol (e.g., Hypertext Transfer Protocol (HTTP)). The request 605 may identify at least one resource (e.g., a webpage, web application, or an element for a web application) to be retrieved from the server 106 via the appliance 200. The resource 605 may use an address (e.g., Universal Resource Locator (URL)) to identify the resource. The request 605 may identify the client 102 as the source to which a subsequent response is to be returned. In turn, the appliance 200 may receive the request 605, and may forward to the server 106 as at least one request 605'. The request 605' sent by the appliance 200 may include or be the request 605 transmitted by the client 102. The request 605' may identify the resource to be retrieved from the server 106 via the appliance 200 for the client 102. In some embodiments, the appliance 200 may modify the source identified by the request 605' from the client 102 to the appliance 200 to which the subsequent response is to be returned.

Upon receipt, the server 106 may parse the request 605' and may identify the resource to be provided to the client 102. To identify, the server 106 may use the address included in the request 605' to identify the resource. With the identification, the server 106 may generate at least one web response 610 to include the identified resource. The identified resource may be the webpage, the web application, or the element for the web application, among others. In some embodiments, the web response 610 may be generated in accordance with the communications protocol (e.g., HTTP). The web response 610 may include or correspond to a script. The script of the web response 610 may be in accordance with a Hypertext Markup Language (HTML), Extensible Markup Language (XML), and JavaScript, among others. Upon generation, the server 106 may return, send, or otherwise provide the web response 610 to the client 102 via the appliance 200. In some embodiments, the server 106 may send or provide the web response 610 to the appliance 200.

The web response 610 may include data 615 corresponding to the identified resource. The data 615 may include sensitive or confidential information. The sensitive information of the data 615 may include at least one class or at least one type of content, among others. For example, the class or type of content of the sensitive information in the data 615 may include: a personal name, a phone number, an email, a personal identification number (e.g., a social security number, a driver's license number, and pass port number), an account number (e.g., employee identification, credit card number, and a bank account number), biometric data (e.g., representations of fingerprint, iris, and voice), among others.

In the web response 610, the data 615 may include one or more elements 620A-N (hereinafter generally referred to as elements 620). Each element 620 may be a programmatically identifiable user interface element. In some embodiments, the data 615 may correspond to a web application, a webpage, or at a portion of the web application or webpage. Individual elements 620 may correspond to or include one or more document object model (DOM) objects. For example, the elements 620 may include a head element (e.g., "<head>"), a section element (e.g., "<div>"), a text element (e.g., "<text>"), a link element (e.g., "<href>"), an inline frame element (e.g., "<iframe>"), an image element (e.g., "<img>"), a canvas element (e.g., "<canvas>"), and a script element (e.g., "<script>"), among others. The DOM objects may be arranged in accordance to a hierarchy. The sensitive information may be located in any of the elements 620 of the web response 610. In some embodiments, the data 615 may correspond to an application (e.g., or content to be presented via the application). Each element 620 may correspond to or include one or more graphical user interface (GUI) elements.

For instance, the elements 620 may correspond to or include a prompt window, a menu bar, a button, a radio button, a checkbox, a text box, an image, a canvas, and a multimedia player, among others.

The response handler 515 of the adaptor engine 505 may receive, retrieve, or otherwise identify the web response 610 from the server 106. Upon receipt, the response handler 515 may parse the web response 610 to extract or identify the data 615. To parse, the response handler 515 may read or interpret the web response 610 (e.g., from a start to an end of the web response 610) to identify the data 615. In some embodiments, the response handler 515 may parse the data 615 (or the web response 610) to extract or identify the sensitive or confidential information. With the identification of the data 615 (or the sensitive content of the data 615), the response handler 515 may parse the data 615 to extract or identify the one or more elements 620 included therein. As discussed above, elements 620 of the data 615 may include or correspond to DOM objects of a web application or a webpage or GUI elements of an application, among others.

In addition, the response handler 515 may determine whether at least one rule 540 (and at least one template 545) exists for the web response 610 for application. The set of rules 540 (and the templates 545) may have been previously generated by the adaptor engine 505 and may be stored and maintained on the database 535. In some embodiments, the rules 540 (and the templates 545) may be indexed using corresponding addresses (e.g., Uniform Resource Locators (URLs)). For example, the database 535 may index the rule 540 previously generated using the web response 610 using the address referencing the web response 610. To determine whether the at least one rule 540 (and at least one template 545) exists, the response handler 515 may identify an address included in or referencing the web response 610 from the server 106. In some embodiments, the response handler 515 may parse the web response 610 to identify the address referencing the data 615 included therein. With the identification, the response handler 515 may access the database 535 to use the address of the web response 610 to search for at least one rule 540 that corresponds to the address. When at least one rule 540 is found in the database 535, the response handler 515 may determine that at least one rule 540 exists for the web response 610. Otherwise, when no rules 540 are found in the database 535, the response handler 515 may determine that no rules 540 exist for the web response 610.

Figure 6B:
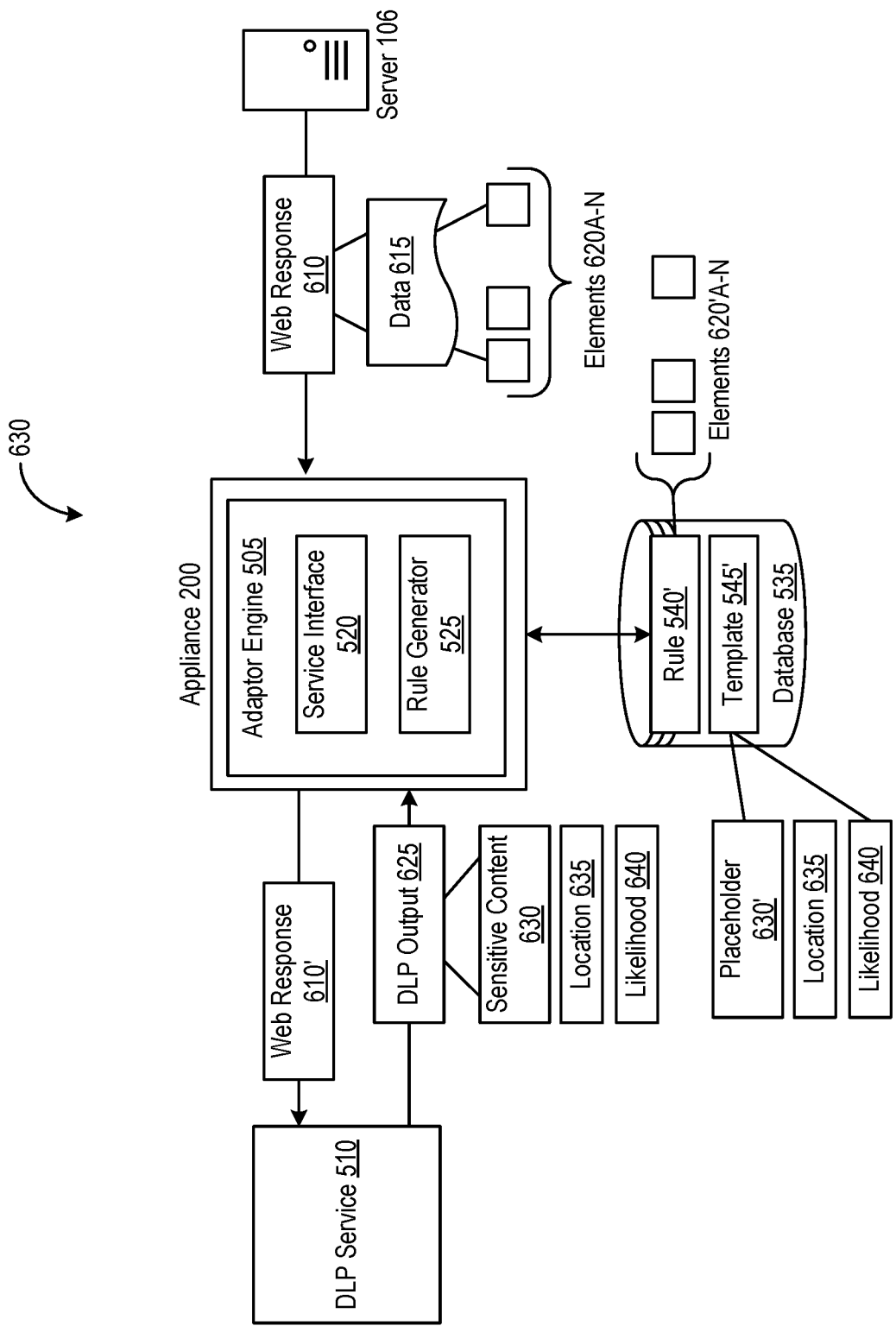
FIG. 6B is a block diagram of a rule generation process for a system for adaptive data loss prevention (DLP) in accordance with an illustrative embodiment.

Referring now to FIG. 6B, depicted is a block diagram of a rule generation process 630 for the system 500 for adaptive data loss prevention (DLP). As illustrated, the service interface 520 of the adaptor engine 505 may transmit, send, or otherwise provide at least one web response 610' to the DLP service 510. When at least one rule 540 is determined to exist for the web response 610, the service interface 520 may forego forwarding of the web response 610 to the DLP service 510, and the adaptor engine 505 may proceed to process using the rule 540. On the other hand, when no rules 540 are determined to exist for the web response 610, the web response 610' may be provided by the service interface 520 to the DLP service 510. In some embodiments, the service interface 520 may forward the web response 610 as the web response 610' to the DLP service 510 in response to the determination. The web response 610' sent to the DLP service 510 may include or correspond to the web response 610 received from the server 106. Likewise, the web response 610' may include at least a portion of the data 615 of the web response 610. In addition, the web response 610' may include at least one of the elements 620. The web response 610' may be, for example, of the following form:

```
JSON Input:
POST
https://dlp.googleapis.com/v2/projects/[PROJECT_ID]/content
:inspect? key={YOUR_API_KEY}
    {
        "item":{
        "value":"My phone number is (415) 555-0890"
        },
        "inspectConfig":{
        "includeQuote":true,
        "minLikelihood":"POSSIBLE",
        "infoTypes":{
"name":"PHONE_NUMBER"
        }
        }
    }
```

As seen in the example above, field-value in the web response 610' may include content (e.g., in the form of HTML) for the web response 610'. By providing the web response 610' to the DLP service 510, the service interface 520 may call or invoke the DLP service 510. In some embodiments, the DLP service 510 may reside on the appliance 200 or may be separate from the appliance 200 (e.g., as depicted).

In some embodiments, the service interface 520 may determine whether DLP service 510 is available or unavailable. The determination may for example be performed when no rules 540 are determined to exist for the web response 610. To determine availability of the DLP service 510, the service interface 520 may transmit or send a request for a status to the DLP service 510. In some embodiments, the web response 610 may be sent as part of the request for the status of the DLP service 510. Upon receipt of the request, the DLP service 510 may return, send, or otherwise provide a response including the status to the service interface 520. The status may indicate that the DLP service 510 is available (or on or enabled) or unavailable (or off, disabled, or under maintenance). In some embodiments, sending the web response 610' to the service interface 510 may result in an error message (e.g., an HTTP error message). The error message may correlate with or indicate that the service interface 510 is unavailable. When the status of the response indicates that the DLP service 510 is available or no error message is received, the service interface 510 may determine that the DLP service 510 is available. Upon the determination that the DLP service 510 is available, the service interface 520 may provide the web response 610' to the DLP service 510. Otherwise, when the status indicates that the DLP service 510 as unavailable or the error message is received, the service interface 520 may determine that the DLP service 510 is unavailable. In some embodiments, the service interface 520 may wait for the response from the DLP service 510, upon sending the request for status. When no response is received within a time limit, the service interface 520 may determine that the DLP service 510 is unavailable.

Based on the web response 610' received from the service interface 520, the DLP service 510 may generate at least one DLP output 625. The receipt of the web response 610' by the DLP service 510 may be when the DLP service 510 is determined by the service interface 520 to be available. In some embodiments, the web response 610' may be received by the DLP service 510 as part of the request. The DLP output 625 may identify or include sensitive content 630 (sometimes referred herein as flagged content), at least one location 635, and at least one indicator 640 (sometimes referred herein as a likelihood). The sensitive content 630 may include a portion of the data 615 in the web response 610' corresponding to sensitive or confidential content. The location 635 may identify one or more positions (e.g., range of indices) of the sensitive or confidential information within the data 615. The indicator 640 may identify a level of confidence that the portion of the data 615 corresponds to the sensitive or confidential information. The DLP output 625 may include or correspond to a script. The script of the DLP output 625 may be in accordance with a Hypertext Markup Language (HTML), Extensible Markup Language (XML), and JavaScript, among others.

In general, to generate the DLP output 625, the DLP service 510 may parse the web response 610' to identify or extract the portion of the data 615 corresponding to the sensitive or confidential content as the sensitive content 630. In some embodiments, the DLP service 510 may use or apply a natural language processing (NLP) techniques (e.g., a regular expression, named-entity recognition, or information extraction, among others) to the data 615 to identify the sensitive or confidential content. In addition, the DLP service 510 may identify a class or type of content for the sensitive content 630. The sensitive content 630 may correspond to one or more of the elements 620 of the data 615 determined to include sensitive or confidential information. With the identification, the DLP service 510 may identify or determine the location 635 corresponding to the sensitive content 630 within the data 615 of the web response 610'. The location 635 may identify or reference the one or more positions of the sensitive content 630 (e.g., in the form of character index) within the data 615 of the web response 610'. In addition, the DLP service 510 may calculate, generate, or determine the indicator 640 for the sensitive content 630. In some embodiments, the DLP service 510 may determine the indicator 640 from application of the NLP techniques. The DLP output 625 may be, for example, of the following form:

```
JSON Output:
{
    "result":{
    "findings":[
{
"quote":"(415) 555-0890"
"infoType":{
    "name":"PHONE_NUMBER"
},
"likelihood":"VERY_LIKELY",
"location":{
        "byteRange":{
            "start":"19",
            "end":"33"
        },
        "codepointRange":{
            "start":"19",
            "end":"33"
        }
},
```

Upon generation, the DLP service 510 may transmit, send, or provide the DLP output 625 to the adaptor engine 505.

Using the DLP output 625 from the DLP service 510 and web response 610 from the server 106, the rule generator 525 of the adapter engine 505 may determine or generate at least one rule 540'. The rule 540' may be generated by the rule generator 525 for the web response 610 and subsequent web responses with the same address from the server 106 to prevent exfiltration (e.g., via displaying or presentation) or loss of sensitive content from the subsequent web response. The rule 540' may be used to be matched against at least one of the elements 620 in the data 615 of the web response 610. Upon receipt, the rule generator 525 may parse the DLP output 625 to identify the sensitive content 630, the location 635, and the indicator 640. Furthermore, the rule generator 525 may parse the data 615 of the web response 610 to identify the one or more elements 620. In generating the rule 540', the rule generator 525 may identify one or more identifiable elements 620'A-N (hereinafter generally referred to as elements 620') from the parsing of the data 615 and the DLP output 625. In some embodiments, the rule generator 525 may generate the identifiable elements 620' from the elements 620 of the data 615. In some embodiments, the elements 620' may correspond to at least a subset of the elements 620 identified as including the sensitive content 630. The elements 620' may be displayable on the resource (e.g., the web application or web page).

In some embodiments, the rule generator 525 may translate or otherwise convert the data 615 to the elements 620'. The conversion by the rule generator 525 may also be from the sensitive content 630 identified by the DLP service 510 as indicated in the DLP output 625. In converting, the rule generator 525 may identify sensitive content 630 and the corresponding location 635 indicated by the DLP output 625. The location 635 may identify the position of the sensitive content 630 within the data 615. For the sensitive content 630, the rule generator 525 may identify the corresponding element 620 in the data 615 using the corresponding location 635. The rule generator 525 may include or use the identified element 620 as one of elements 620' for generating the rule 540'. In identifying the elements 620', the rule generator 525 may traverse through the sensitive content 630 in the DLP output 625.

In some embodiments, the rule generator 525 may identify the likelihood 650 for the sensitive content 630. The rule generator 525 may compare the likelihood 650 to a threshold value (sometimes referred herein as a threshold condition). The threshold value may demarcate or delineate a value of the likelihood 650 at which the corresponding element 620 is to be included as one of the elements 620' for generating the rule 540'. For example, the threshold value may correspond to "very likely" or "likely" indicated in the indicator 640 as identified in the DLP output 625. When the likelihood 650 satisfies the threshold value (e.g., greater than or equal to), the rule generator 525 may include the corresponding element 620 for use in generating the rule 540'. Otherwise, when the likelihood 650 does not satisfy the threshold value (e.g., less than), the rule generator 525 may exclude the corresponding element 620. The rule generator 525 may use the identified subset of elements 620 as the elements 620' for generating the rule 540'.

The elements 620' may be used to define the rule 540' for the web responses with the same address as the web response 610. The elements 620' may identify, include, or correspond to one or more attributes, such as: an object type, a prefix, a suffix, a label, a length (or number) of characters, a type of characters of the sensitive data, and location values, among others. The object type may identify one or more DOM elements for the element 620' of the sensitive content 630. In some embodiments, the object type may also identify a hierarchy or structure for the one or more DOM elements. The prefix may identify or include a fixed set of alphanumeric characters included prior to the sensitive content 630. The suffix may identify or include another fixed set of alphanumeric characters included subsequent to the sensitive content 630. The label may identify a type of content or classification for the sensitive content 630. The length or number of characters may define or identify a string length of the set of alphanumeric characters that constitute the sensitive content 630. The type of characters may identify whether each character in the sensitive content 630 is an alphabetical or numerical, among others. The location values may indicate or define one or more positions within the data 615 corresponding to the sensitive content 630. The location values may be defined in terms of absolute position or relative position.

With the identification of elements 620', the rule generator 525 may determine or generate specifications (sometimes referred herein as data fields) of the rule 540' corresponding to the attributes of the element 620'. The rule 540' may identify or include one or more specifications corresponding to one of the attributes. For the object type, the rule generator 525 may identify the DOM elements from the data 615 constituting the sensitive content 630. For the prefix, the rule generator 525 may identify the one or more alphanumeric characters occurring prior to the sensitive content 630 identified within the data 615. For the suffix, the rule generator 525 may identify the one or more alphanumeric characters occurring subsequent to the sensitive content 630 identified within the data 615. For the type of content or classification to be used in the rule 540', the rule generator 525 may identify the class or type of content for the sensitive content 630 as indicated in the DLP output 625 generated by the DLP service 510. In some embodiments, the rule generator 525 may identify the class or type of content from the corresponding element 620 in the data 615 of the web response 610. For the length or number of characters, the rule generator 525 may identify the string length of the sensitive content 630. For the type of characters, the rule generator 525 may parse through the sensitive content 630 to identify characters as one of alphabetical or numerical, among others. For the location values, the rule generator 525 may identify the one or more positions within the data 615 corresponding to the sensitive content 630 as indicated in the location 635 of the DLP output 625. In some embodiments, the rule generator 525 may determine the absolute position or the relative position of the sensitive content 630.

The rule generator 525 may generate a set of rules 540' based on the following examples of web responses 610:

| | Example 1 |
|---|---|
| Web Response | <html><br><head><br><title>Title</title><br></head><br><body><br><div class="divclass" id="divid">My phone number is 123456789</div><br></body><br></html> |

-continued

|  | Example 1 |
|---|---|
| AbsoluteLocation Start (wrt full web Response as sent by DLP) | 102 |
| AbsoluteLocationEnd (wrt full web Response as sent by DLP) AbsoluteLocationEnd = AbsoluteLocation Start + strlen(sensitivecontent) Length of Sensitive Content = AbsoluteLocationStart − AbsoluteLocationEnd | 111 |
|  | 9 |
| Web Element (represents Element/Structure/Hierarchy in the DOM) | Type=Div, Id=divid, Class=divclass |
| Prefix | My phone number is |
| Suffix | Empty |
| RelativeLocationStart (wrt. Element as identified by Web DLP Adapter) | Strlen(Prefix) =18 |
| RelativeLocationEnd (wrt. Element as identified by Web DLP Adapter) | 27 |
| SensitiveValueItemsDataClass (Each character's class) | 123456789 has 1=numeric 2=numeric 3=numeric 4=numeric 5=numeric 6=numeric 7=numeric 8=numeric 9=numeric |
| LabelAssociatedType (identified from the DOM ex: LHS of text input is its label element or sometimes the structure is that label is on top and element is below) | None |

Table 1 shows an example of a rule 540' generated for a web response 610 that includes the text "My phone number is 123456789".

|  | Example 2 |
|---|---|
| Web Response | \<html\> \<head\> \<title\>Title\</title\> \</head\> \<body\> \<div class="divclass" id="divid"\>My tele phone number is 321456987\</div\> \</body\> \</html\> |
| AbsoluteLocation Start (wrt full web Response as sent by DLP) | 107 |
| AbsoluteLocationEnd (wrt full web Response as sent by DLP) AbsoluteLocationEnd = AbsoluteLocation Start + strlen(sensitivecontent) Length of Sensitive Content = AbsoluteLocationStart − AbsoluteLocationEnd | 116 |
|  | 9 |
| Web Element (represents Element/Structure/Hierarchy in the DOM) | Type=Div, Id=divid, Class=divclass |
| Prefix | My tele phone number is |
| Suffix | Empty |
| RelativeLocationStart (wrt. Element as identified by Web DLP Adapter) | Strlen(Prefix) = 23 |
| RelativeLocationEnd (wrt. Element as identified by Web DLP Adapter) | 32 |
| SensitiveValueItemsDataClass (Each character's class) | 321456987 has 1=numeric 2=numeric 3=numeric 4=numeric 5=numeric 6=numeric 7=numeric |

|  | Example 2 |
| --- | --- |
| LabelAssociatedType (identified from the DOM ex: LHS of text input is its label element or sometimes the structure is that label is on top and element is below) | 8=numeric<br>9=numeric<br>None |

Table 2 shows an example of a rule 540' generated for a web response 610 that includes the text "My telephone number is 321456987".

|  | Example 3 |
| --- | --- |
| Web Response | <html><br><head><br><title>Title</title><br></head><br><body><br><div class="divclass" id="divid">My phone number is +1 123456789 (mobile)</div><br></body><br></html> |
| AbsoluteLocation Start (wrt full web Response as sent by DLP) | 102 |
| AbsoluteLocationEnd (wrt full web Response as sent by DLP) AbsoluteLocationEnd = AbsoluteLocation Start + strlen(sensitivecontent) | 114 |
| Length of Sensitive Content = AbsoluteLocationStart − AbsoluteLocationEnd | 12 |
| Web Element (represents Element/Structure/Hierarchy in the DOM) | Type=Div,<br>Id=divid,<br>Class=divclass |
| Prefix | My phone number is |
| Suffix | (mobile) |
| RelativeLocationStart (wrt. Element as identified by Web DLP Adapter) | Strlen(Prefix) |
| RelativeLocationEnd (wrt. Element as identified by Web DLP Adapter) | 18 |
|  | 30 |
| SensitiveValueItemsDataClass (Each character's class) | +1 123456789 has<br>1=non-alphanumeric<br>2=numeric<br>3=non-alphanumeric<br>4=numeric<br>5=numeric<br>6=numeric<br>7=numeric<br>8=numeric<br>9=numeric<br>10=numeric<br>11=numeric<br>12=numeric |
| LabelAssociatedType (identified from the DOM ex: LHS of text input is its label element or sometimes the structure is that label is on top and element is below) | None |

Table 3 shows an example of a rule 540' generated for a web response 610 that includes the text "My phone number is 123456789".

|  | Example 4 |
| --- | --- |
| Web Response | <html><br><head><br><title>Title</title><br></head> |

|  | Example 4 |
| --- | --- |
|  | <body><br><div class="divclass_label" id="divclasslabel">City</div><br><div class="cityclass" id="cityid"> San Francisco</div><br></body><br></html> |
| AbsoluteLocation Start (wrt full web Response as sent by DLP) | 137 |
| AbsoluteLocationEnd (wrt full web Response as sent by DLP) AbsoluteLocationEnd = AbsoluteLocation Start + strlen(sensitivecontent) | 150 |
| Length of Sensitive Content = AbsoluteLocationStart − AbsoluteLocationEnd | 13 |
| Web Element (represents Element/Structure/Hierarchy in the DOM) | Type=Div, Id=cityid, Class=cityclass |
| Prefix | Empty |
| Suffix | Empty |
| RelativeLocationStart (wrt. Element as identified by Web DLP Adapter) | Strlen(Prefix) =0 |
| RelativeLocationEnd (wrt. Element as identified by Web DLP Adapter) | 13 |
| SensitiveValueItemsDataClass (Each character's class) | San Francisco has<br>1=character<br>2=character<br>3=character<br>4=non-alphanumeric<br>5=character<br>6=character<br>7=character<br>8=character<br>9=character<br>10=character<br>11=character<br>12=character<br>13=character |
| LabelAssociatedType (identified from the DOM ex: LHS of text input is its label element or sometimes the structure is that label is on top and element is below) | City |

Table 4 shows an example of a rule 540' generated for a web response 610 that includes the text "San Francisco".

|  | Example 5 |
| --- | --- |
| Web Response | <html><br><head><br><title>Title</title><br></head><br><body><br><div class="divclass" id="divid">My tele phone number is 987654321</div><br></body><br></html> |
| AbsoluteLocation Start (wrt full web Response as sent by DLP) | 107 |
| AbsoluteLocationEnd (wrt full web Response as sent by DLP) AbsoluteLocationEnd = AbsoluteLocation Start + strlen(sensitivecontent) | 116 |
| Length of Sensitive Content = AbsoluteLocationStart − AbsoluteLocationEnd | 9 |
| Web Element (represents Element/Structure/Hierarchy in the DOM) | Type=Div, Id=divid, Class=divclass |

|  | Example 5 |
|---|---|
| Prefix | My tele phone number is |
| Suffix | Empty |
| RelativeLocationStart (wrt. Element as identified by Web DLP Adapter) | Strlen(Prefix) = 23 |
| RelativeLocationEnd (wrt. Element as identified by Web DLP Adapter) | 32 |
| SensitiveValueItemsDataClass (Each character's class) | 987654321 has<br>1=numeric<br>2=numeric<br>3=numeric<br>4=numeric<br>5=numeric<br>6=numeric<br>7=numeric<br>8=numeric<br>9=numeric |
| LabelAssociatedType (identified from the DOM ex: LHS of text input is its label element or sometimes the structure is that label is on top and element is below) | None |

Table 5 shows an example of a rule 540' generated for a web response 610 that includes the text "My telephone number is 987654321".

|  | Example 6 |
|---|---|
| Web Response | \<html\><br>\<head\><br>\<title\>Title\</title\><br>\</head\><br>\<body\><br>\<div class="divclass_label" id="divclasslabel"\>City\</div\><br>\<div class="cityclass" id="cityid"\> Fort Lauderdale\</div\><br>\</body\><br>\</html\> |
| AbsoluteLocation Start (wrt full web Response as sent by DLP) | 137 |
| AbsoluteLocationEnd (wrt full web Response as sent by DLP) AbsoluteLocationEnd = AbsoluteLocation Start + strlen(sensitivecontent) | 152 |
| Length of Sensitive Content = AbsoluteLocationStart − AbsoluteLocationEnd | 13 |
| Web Element (represents Element/Structure/Hierarchy in the DOM) | Type=Div,<br>Id=cityid,<br>Class=cityclass |
| Prefix | Empty |
| Suffix | Empty |
| RelativeLocationStart (wrt. Element as identified by Web DLP Adapter) | Strlen(Prefix)<br>=0 |
| RelativeLocationEnd (wrt. Element as identified by Web DLP Adapter) | 15 |
| SensitiveValueItemsDataClass (Each character's class) | Fort Lauderdale has<br>1=character<br>2=character<br>3=character<br>4=character<br>5=non-alphanumeric<br>6=character<br>7=character<br>8=character<br>9=character<br>10=character<br>11=character<br>12=character<br>13=character<br>14=character<br>15=character |

| Example 6 | |
|---|---|
| LabelAssociatedType (identified from the DOM ex: LHS of text input is its label element or sometimes the structure is that label is on top and element is below) | City |

Table 6 shows an example of a rule 540' generated for a web response 610 that includes the text "Fort Lauderdale".

In addition, the rule generator 525 may determine or generate at least one template 545' using the DLP output 625 from the DLP service 510 and web response 610 from the server 106. The template 545' may include or correspond to a (default, base or defined) script, document, data structure and/or data format, which may be re-usable or adaptable to include certain similar data. The template 545' may include one or more fields, placeholders, default values and/or spaces for particular types of data. The script of the web response 610 may be in accordance with a Hypertext Markup Language (HTML), Extensible Markup Language (XML), and JavaScript, among others. To generate the template 545', the rule generator 525 may parse the DLP output 625 to identify fields corresponding to the sensitive content 630. For the sensitive content 630, the rule generator 525 may maintain the location 635 and the indicator 640 from the DLP output 625 for the new template 545'.

In addition, the rule generator 525 may substitute or replace sensitive content 630 with a corresponding placeholder 630' in the DLP output 625. The placeholder 630' may include or correspond to, for example, a set of alphanumeric characters. With the replacement of the sensitive content 630 with the placeholder 630', the rule generator 525 may use the DLP output 625 as the template 545' for subsequent web responses with the same address as the web response 610. For example, the rule generator 525 may generate the template 545' of the following form:

```
JSON Output:
{
    "result":{
    "findings":[
    {
    "quote":$$WebDLP1$$
    "infoType":{
            "name":"PHONE_NUMBER"
    },
    "likelihood":"VERY_LIKELY",
    "location":{
            "byteRange":{
                "start":"19",
                "end":"33"
            },
            "codepointRange":{
                "start":"19",
                "end":"33"
            }
    },
```

In the example above, the sensitive content 630 of the original DLP output 625 may have included ""quote":(415 555-0890)". In generating the template 545', the rule generator 525 may replace the sensitive content 630 with the placeholder 630' "$$WebDLP1$$" as shown.

In some embodiments, the rule generator 525 may parse the sensitive content 630 included in the original DLP output 625 to identify the sensitive content 630. For example, the rule generator 525 may traverse through the fields for the sensitive content 630 identified by the original DLP output 625 to find each individual piece of sensitive content 630. For sensitive content 630 identified, the rule generator 525 may replace the sensitive content 630 with the placeholder 630'. The placeholder 630' may include an indication of the number or the type of sensitive content 630 to be replaced. For example, the rule generator 525 may replace the sensitive content 630 with the placeholder 630' "$$WebDLPN$$" with "N" indicating the number of instances of sensitive content 630 that to be replaced in the DLP output 625. In the example above, the placeholder 630' includes "1" as "N" in "$$WebDLPN$$" to signify that the sensitive content 630 is the first to be replaced within the sensitive content 630 of the DLP output 625.

With the generation, the rule generator 525 may store and maintain the rule 540' and the template 545' for subsequent web responses with the same address as the web response 610 on the database 535. In some embodiments, the rule generator 525 may store an association between the rule 540' and the template 545' with the address for the web response 610. For example, the rule generator 525 may use the address for the web response 610 to index the rule 540' and the template 545' in the database 535. The association may be used to find the rule 540' or the template 545' for subsequent web responses with the same address.

Figure 6C:
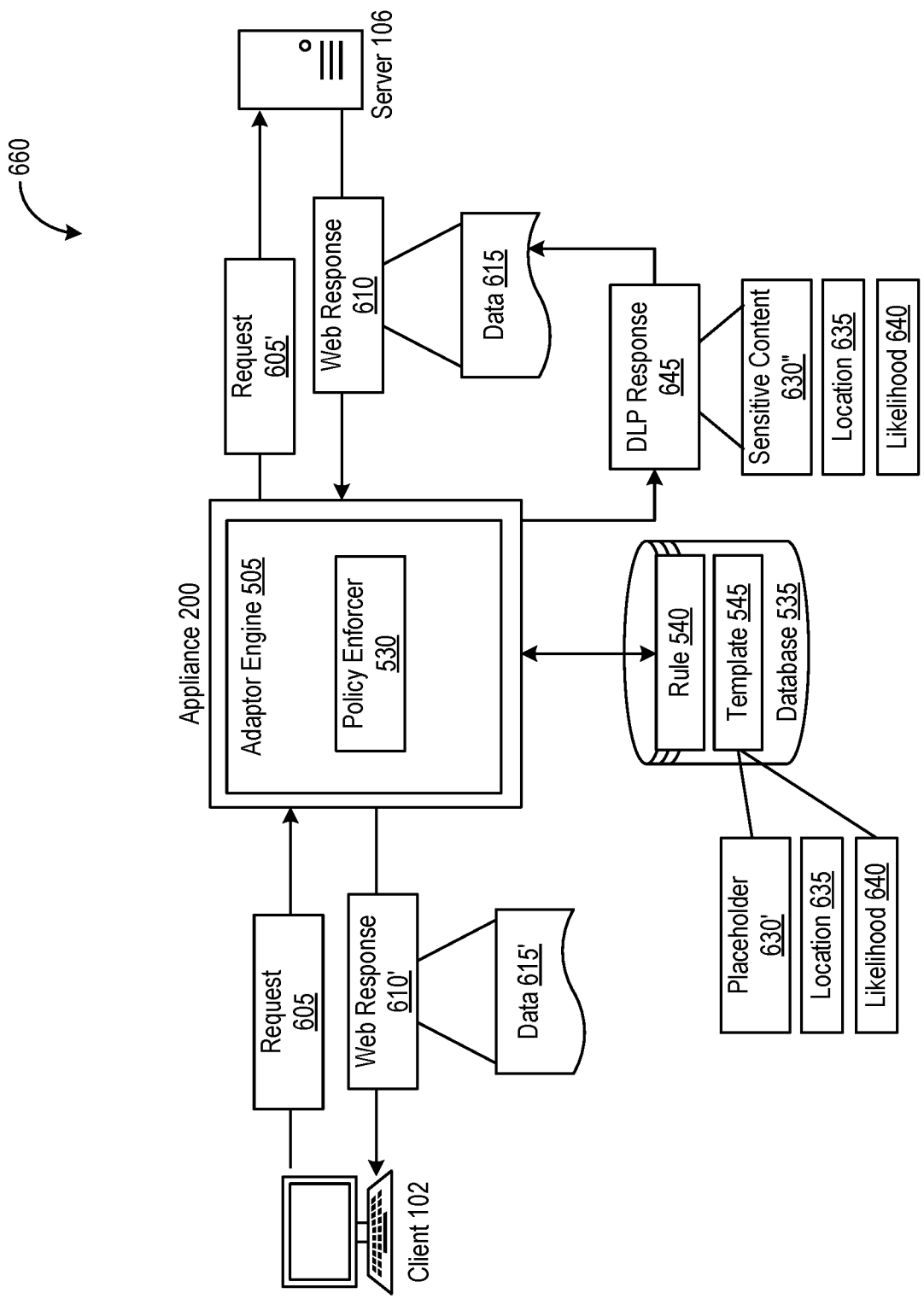
FIG. 6C is a block diagram of a DLP response process for a system for adaptive data loss prevention (DLP) in accordance with an illustrative embodiment.

Referring now to FIG. 6C, depicted is a block diagram of a DLP response process 660 for the system 500 for adaptive data loss prevention (DLP). As illustrated, the policy enforcer 530 of the adaptor engine 505 may retrieve, find, or otherwise identify one or more rules 540 with which to compare against the web response 610 including the data 615. As discussed above, the data 615 of the web response 610 may include or contain sensitive or confidential information. The identification of the rule 540 may be performed when at least one rule 540 is determined to exist for the web response 610 based on the address. In addition, the identification of the rule 540 may be performed when the DLP service 510 is determined to be unavailable or available. In this manner, the adaptor engine 505 may permit the client 102 to access at least a portion of the data 615 in the web response 610, without reliance on the availability of the DLP service 510. In some embodiments, the policy enforcer 530 may identify the one or more rules 540 from the database 535 using the address for the web response 610. In some embodiments, the policy enforcer 530 may identify the new rule 540' as to be applied to the web response 610, when no previous rule 540 is determined to exist for the web response 610. The new rule 540' may be used by the policy enforcer 530 in the same manner as the rule 540 as described herein below.

For rules 540 identified from the database 535, the policy enforcer 530 may identify or determine a match of the web response 610 in accordance with the rule 540. The determination of the match may be based on the comparison between specifications of the rule 540 and attributes of the one or more corresponding elements 620 in the data 615 of the web response 610. The match may be one of complete or incomplete matches. As discussed above, the attributes of the elements 620 may include the object type, the prefix, the suffix, the label, the length (or number) of characters, the type of characters of the sensitive data, and the location values, among others. The one or more elements 620 may correspond to the portions of the data 615 including sensitive or confidential information. The policy enforcer 530 may identify the specifications of the rule 540 identified for the web response 610.

For the specifications of the rule 540, the policy enforcer 530 may determine whether the corresponding attributes of the elements 620 of the data 615 are in compliance with the rule 540. In comparing with the attributes of the elements 620, the policy enforcer 530 may compare with the corresponding specifications of the rule 540. For the object type, the policy enforcer 530 may determine whether the elements 620 correspond or match with the DOM elements (and the hierarchy) as specified by the rule 540. When the elements 620 do not match, the policy enforcer 530 may determine that the object type of the elements 620 is not in compliance. Otherwise, when the elements 620 match, the policy enforcer 530 may determine that the object type of the elements 620 is in compliance. Furthermore, using the location values as specified by the rule 540, the policy enforcer 530 may identify sensitive information within the data 615 of the web response 610. The location values as defined by the rule 540 may correspond to the expected positions within the data 615 that correspond to the sensitive information. In some embodiments, the policy enforcer 530 may identify the sensitive information in accordance with the absolute location within the data 615 of the web response 610 as defined by the rule 540. The absolute location may be relative to an end (e.g., a start or a terminal end) of the data 615 in the web response 610. In some embodiments, the policy enforcer 530 may identify the sensitive information based on the relative location within the data 615 as defined by the rule 540. The relative location may be defined in relation to another element 620 or another portion of the data 615 within the web response 610. The location value may be relative within the element 620 as specified in the DOM elements specified by the rule 540.

For the prefix, the policy enforcer 530 may identify the one or more characters prior to the sensitive information in the data 615 of the web response 610. With the identification, the policy enforcer 530 may determine whether the characters correspond to or match with the characters specified for the prefix by the rule 540. When the characters do not match, the policy enforcer 530 may determine that the characters are not in compliance with the prefix specifications of the rule 540. Conversely, when the characters match, the policy enforcer 530 may determine that the characters are in compliance with the prefix specifications of the rule 540. Likewise, for the suffix, the policy enforcer 530 may identify the one or more characters subsequent to the sensitive information in the data 615 of the web response 610. With the identification, the policy enforcer 530 may determine whether the characters correspond to or match with the characters specified for the suffix by the rule 540. When the characters do not match, the policy enforcer 530 may determine that the characters are not in compliance with the prefix specifications of the rule 540. On the other hand, when the characters match, the policy enforcer 530 may determine that the characters are in compliance with the suffix specifications of the rule 540.

For the label, the policy enforcer 530 may identify the type of content or classification for the sensitive information from the element 620 of the data 615. With the identification, the policy enforcer 530 may determine whether the type corresponds to or matches the type specified by the label of the rule 540. When the type does not match the label of the rule 540, the policy enforcer 530 may determine that the label is not in compliance with the rule 540. In contrast, when the labels matches the label of the rule 540, the policy enforcer 530 may determine that the label is in compliance. For the type of characters, the policy enforcer 530 may identify each character in the sensitive information identified within the data 615 of the web response 610 as one of alphabetic or numeric. The policy enforcer 530 may compare the identified characters of the sensitive information with the types of characters defined in the rule 540. When any of the characters differ from the type of characters specified from the rule 540, the policy enforcer 530 may determine that the characters are not in compliance. Conversely, when all the characters match or correspond to the type of characters specified by the rule 540, the policy enforcer 530 may determine that the characters are in compliance. For the length or number of characters, the policy enforcer 530 may identify the number of characters in the sensitive information in the data 615 of the web response 610. The policy enforcer 530 may compare the identified number against the number of characters as specified by the rule 540. When the number of characters match, the policy enforcer 530 may determine that the number of characters are in compliance with the rule 540. Otherwise, when the number of characters do not match, the policy enforcer 530 may determine that the number of characters are not in compliance.

When all the attributes of the elements 620 are determined to be in compliance with the rule 540, the policy enforcer 530 may determine a complete match (sometimes referred herein as a valid match) between the rule 540 and the sensitive information in the data 615. Conversely, when at least one attribute of the elements 620 is determined to be not in compliance with the rule 540, the policy enforcer 530 may determine an incomplete match (sometimes referred herein as an invalid match) between the rule 540 and the sensitive information in the data 615. In some embodiments, when determined to be not in compliance, the policy enforcer 530 may identify another rule 540 for the web response 610 based on the address, and may repeat the comparisons. When no rule 540 is found, the policy enforcer 530 may determine whether the DLP service 510 is available. When available, a new rule 540' may be generated in the manner discussed above in conjunction with FIG. 6B. Otherwise, the policy enforcer 530 may continue processing the web response 610 with the determination of the incomplete match. Moreover, with multiple instances of sensitive information in the data 615, the policy enforcer 530 may determine a complete match between at least one of the rules 540 and one set of sensitive information. The policy enforcer 530 may also determine an incomplete match between one or more of the rules 540 and another set of sensitive information in the data 615 of the web response 610.

Based on the determination of the match with the rule 540, the policy enforcer 530 may identify the template 545 corresponding to the rule 540. When the complete match is determined with the data 615 in the web response 610 in accordance with the rule 540, the policy enforcer 530 may identify or select the template 545 (e.g., from a plurality of templates). In some embodiments, the policy enforcer 530 may identify the template 545 from the database 535 based on the address for the web response 610. The identified template 545 may include one or more placeholders 630', and the location 635 and the indicator 640 for each placeholder 630'. Placeholders 630' may correspond to sensitive information identified in the data 615 in accordance with the rule 540.

In accordance with the template 545 and the match, the policy enforcer 530 may determine or generate at least one DLP response 645 to apply to the data 615 of the web response 610. The DLP response 645 may alter, modify, or redact at least a portion of the data 615 as defined by the template 545. In some embodiments, the DLP response 645 may indicate alteration, modification, or redaction of at least the portion of the data 615. The DLP response 645 provided by the policy enforcer 530 may be similar to the DLP output 625. The alteration, modification, or redaction of portions of the data 615 in accordance with the DLP response 645 may be in place of or instead of the DLP output 625 generated by the DLP service 510. For a given match with the rule 540, the policy enforcer 530 may use the corresponding template 545 in generating the DLP response 645. For example, with multiple instances of sensitive information in the data 615 matched to multiple rules 540, the policy enforcer 530 may generate at least one DLP response 645 to alter, modify, or redact the corresponding portions in the data 615.

To generate the DLP response 645, the policy enforcer 530 may parse the template 545 to identify one or more placeholders 630' corresponding to sensitive information in the data 615. Placeholders 630' identified from the template 545 may correspond to sensitive information identified from the data 615 in accordance with the match to the rule 540. For example, the sensitive information may have been identified in the data 615 at the location values defined by the rule 540 that is determined to be matched. With the identification, the policy enforcer 530 may insert or replace the sensitive information identified from the data 615 with the placeholder 630' in the template 545 as the sensitive content 630". The policy enforcer 530 may traverse through the template 545 and continue to replace placeholders 630' with the sensitive information until completion.

Upon generation, the policy enforcer 530 may provide the DLP response 645 to be applied to the data 615. In some embodiments, the policy enforcer 530 may provide the DLP response 645 to the server 106 for the server 106 to apply to the data 615 of the web response 610. In some embodiments, the policy enforcer 530 may provide the DLP Response 645 to another network device (e.g., residing between the appliance 200 and the client 102) for the network device to apply. In some embodiments, the policy enforcer 530 itself may apply the DLP response 645 to the data 615 of the web response 610. In applying, the policy enforcer 530 may alter, modify, or redact portions of the data 615 in accordance with the DLP response 645. The policy enforcer 530 may identify the sensitive content 630" in the data 615 based on the location 635 as defined in the DLP response 645. In accordance with the application, the policy enforcer 530 may generate a web response 610' including data 615'. The data 615' may correspond to the data 615 with the sensitive content 630" removed. Upon generation, the policy enforcer 530 may provide the web response 610' including the data 615' to the client 102.

In contrast, with the determination of the incomplete match with the data 615 in the web response 610, the policy enforcer 530 may generate or provide the DLP response 645 to maintain the corresponding data 615. The DLP response 645 may secure, keep, or otherwise maintain the data 615. In some embodiments, the DLP response 645 may indicate securing, keeping, or maintenance of the data 615. In some embodiments, the policy enforcer 530 may identify the template 545 from the database 535 corresponding to the rule 540 with the incomplete match. For example, the policy enforcer 530 may determine that at least a portion of the data 615 matches the rule 540 with respect to the web elements, prefix, and suffix, but not the types of characters. Using the corresponding template 545, the policy enforcer 530 may generate the DLP response 645 to maintain the corresponding portion of the data 615. In generating, the policy enforcer 530 may maintain the placeholder 630' in the DLP response 645.

With multiple instances of data 615 in the web response 610, the policy enforcer 530 may determine a complete match with one instance of data 615 with at least one rule 540. The policy enforcer 530 may identify the template 545 corresponding to the rule 540 from the database 535. Conversely, the policy enforcer 530 may determine an incomplete match with another instance of data 615 with another rule 540. Based on these determinations, the policy enforcer 530 may generate or provide the DLP response 645 using the template 545. The DLP response 645 may redact (or may indicate to redact) the first instance of data 615 determined to be the complete match with the rule 540. In addition, the DLP response 645 may maintain (or may indicate to maintain) the second instance of data 615 determined to be the incomplete match with the other rule 540.

In this manner, once rules 540 are generated using the DLP outputs 625 from the DLP service 510, the adaptor engine 505 may use one or more of the rules 540 to process subsequent web responses from the same server 106 or address. The rules 540 may be used independently of the DLP service 510, even when the DLP service 510 is experiencing an outage or otherwise unavailable, or even when available. With the reduction of dependence on the DLP service 510, the adaptor 505 running on the appliance 200 may lessen the consumption of computing resources and network bandwidth arising from invoking the DLP service 510. In addition, the adaptor 505 may allow the continual flow of requests 605 and web responses 610 between the client 102 and server 106 through the appliance 200. The allowance of continuing flow may increase the utility of the appliance 200 in network communications with the client 102 and the server 106.

Figure 7A:
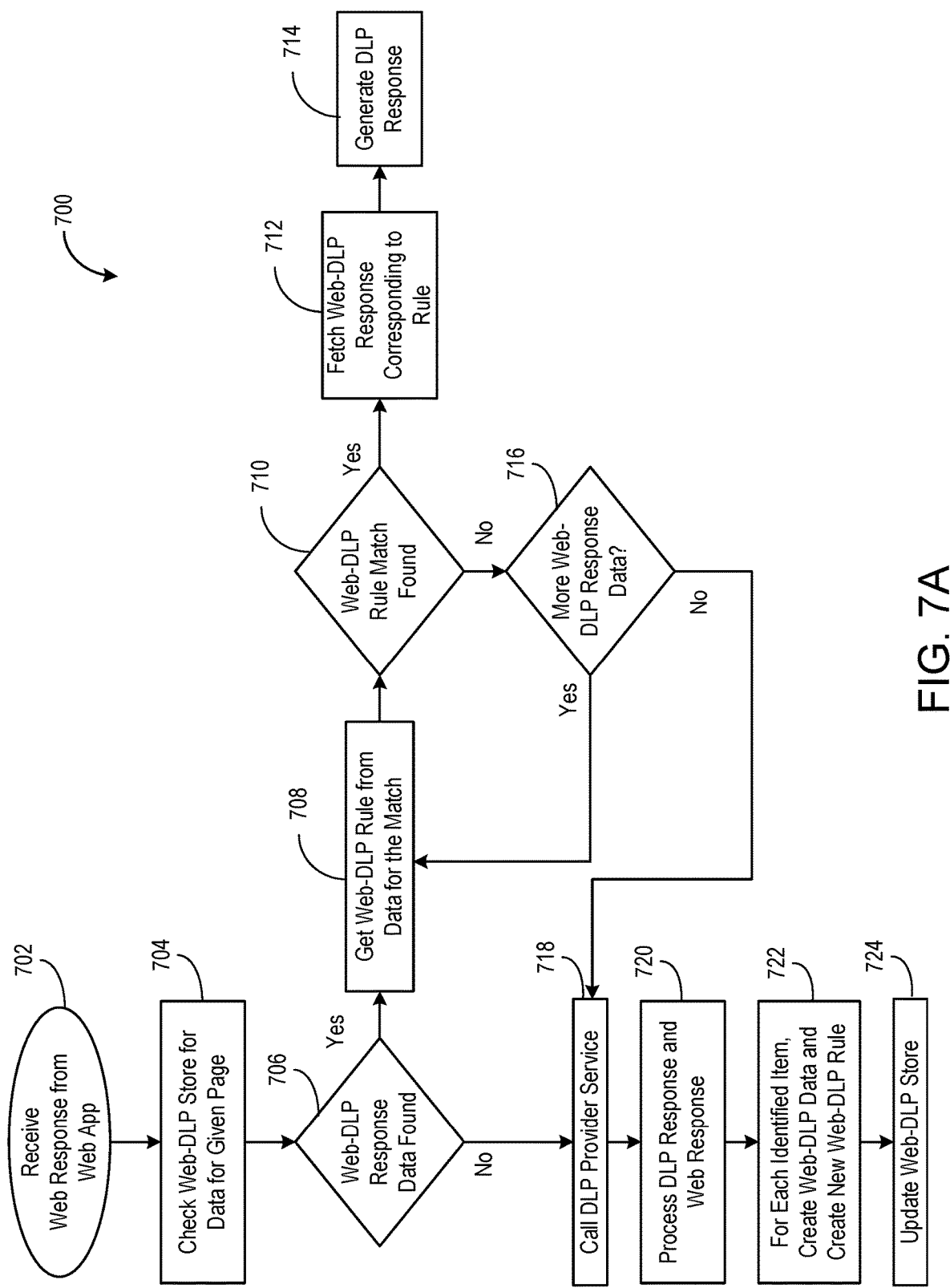
FIGS. 7A and 7B each are flow diagram of a method of an adaptive data loss prevention (DLP) in accordance with an illustrative embodiment.

Referring now to FIG. 7A, depicted is flow diagram of a method 700 of an adaptive data loss prevention (DLP). The functionalities of method 700 may be implemented using, or performed by, the components described in FIGS. 1-6C, such as the appliance 200 and the DLP service 510. As illustrated, an adaptor engine (e.g., the adaptor engine 505 on the appliance 200) may receive a web response (e.g., the web response 610) from a web application (e.g., hosted on the server 106) (702). Upon receipt, the adaptor engine may check a web-DLP store (e.g., the database 535) for data for the web response (704). The adaptor engine may determine whether a web-DLP response (e.g., the DLP output 625) is found from the web-DLP store (706).

When the web-DLP response is determined to be found, the adaptor engine may obtain the web-DLP rule (e.g., the rule 540) from the data for a match (708). The adaptor engine may determine whether a matching web-DLP rule is found for the web response (710). If the matching web-DLP rule is found, the adaptor engine may fetch a web-DLP response (e.g., the template 545) corresponding to the rule (712). Upon fetching, the adaptor engine may generate a DLP response (e.g., the DLP response 645) (714). Conversely, if no matching web-DLP response is found, the adaptor engine may determine whether more web-DLP response data exists (716). If more data are determined to exist, the adaptor engine may obtain another web-DLP rule from the data for matching, and repeat subsequent operations.

When the web-DLP response is determined to be not found or when no more web-DLP response data exists, the adaptor engine may call the DLP provider service (e.g., DLP service 510) (718). The adaptor engine may process the DLP response (e.g., the DLP output 625) and the web response (720). For the identified items (e.g., element 620'), the adaptor engine may create web-DLP data (e.g., the template 545') and new web-DLP rule (e.g., the rule 535') (722). The adaptor engine may update the web-DLP store (724).

Figure 7B:
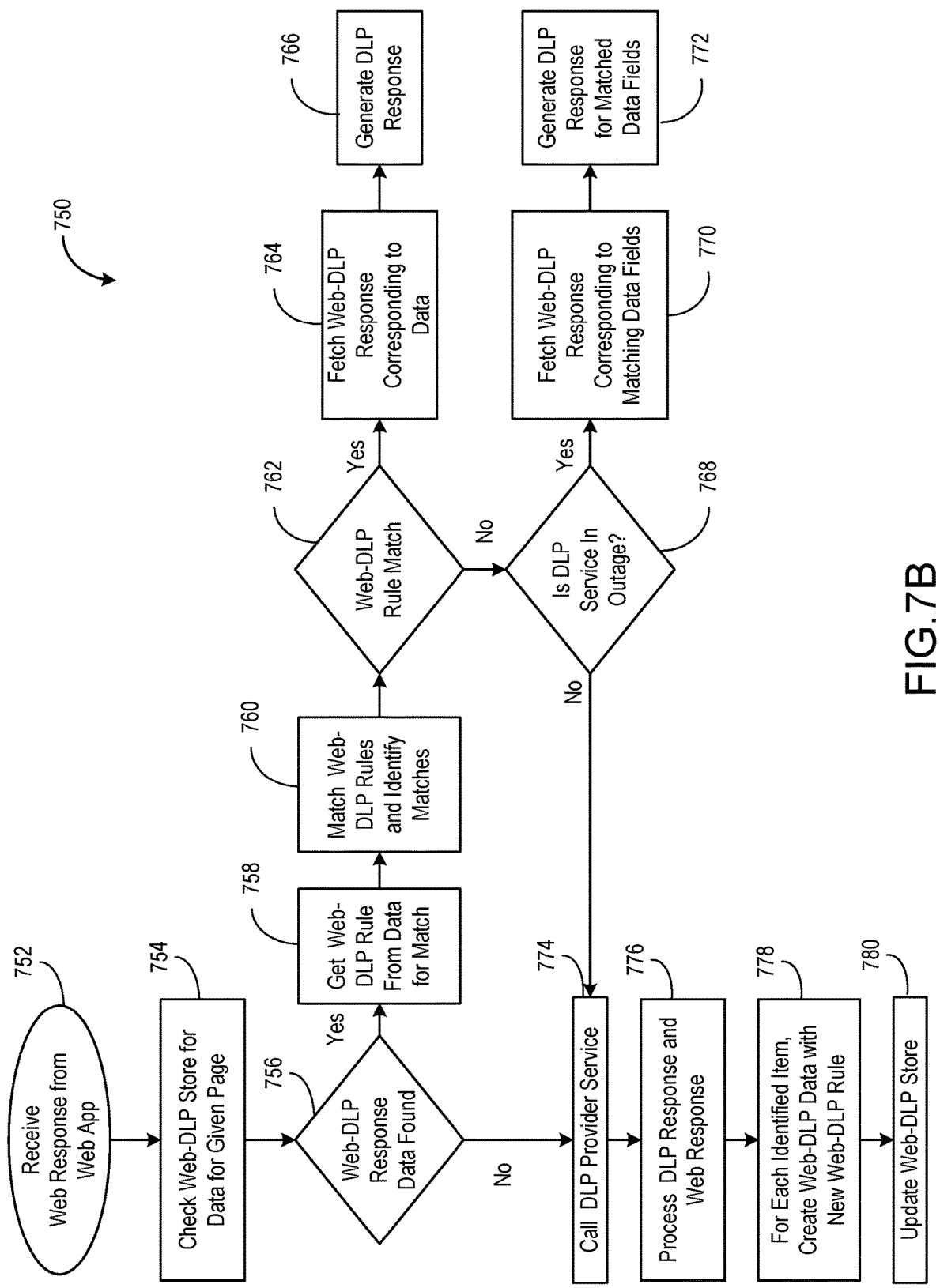

Referring now to FIG. 7B, depicted is flow diagram of a method 750 of an adaptive data loss prevention (DLP). The functionalities of method 750 may be implemented using, or performed by, the components described in FIGS. 1-6C, such as the appliance 200, the adaptor engine 505, and the DLP service 510. The method 750 may be similar to the method 700. As illustrated, an adaptor engine (e.g., the adaptor engine 505 on the appliance 200) may receive a web response (e.g., the web response 610) from a web application (e.g., hosted on the server 106) (752). Upon receipt, the adaptor engine may check a web-DLP store (e.g., the database 535) for data for the web response (754). The adaptor engine may determine whether a web-DLP response (e.g., the DLP output 625) is found from the web-DLP store (756).

When the web-DLP response is determined to be found, the adaptor engine may obtain the web-DLP rule (e.g., the rule 540) from the data for a match (758). The adaptor engine may match the web-DLP rules and may identify matches (760). The adaptor engine may determine whether a matching web-DLP rule is found for the web response (762). If the matching web-DLP rule is found, the adaptor engine may fetch a web-DLP Response (e.g., the template 545) corresponding to the data (764). The adaptor engine may generate a DLP response (e.g., the DLP response 645) (766).

Conversely, if no matching web-DLP response is found, the adaptor engine may determine whether the DLP service is in an outage (768). When the DLP service is determined to be in an outage, the adaptor engine may fetch the web-DLP response corresponding to the matching data fields (770). The adaptor engine may generate a DLP response for the matched data fields (772). Otherwise, when the DLP service is determined to be available, the adaptor engine may call the DLP provider service (e.g., DLP service 510) (774). The adaptor engine may process the DLP response (e.g., the DLP output 625) and the web response (776). For items identified (e.g., element 620'), the adaptor engine may create web-DLP data (e.g., the template 545') and new web-DLP rule (e.g., the rule 535') (778). The adaptor engine may update the web-DLP store (780).

Figure 8:
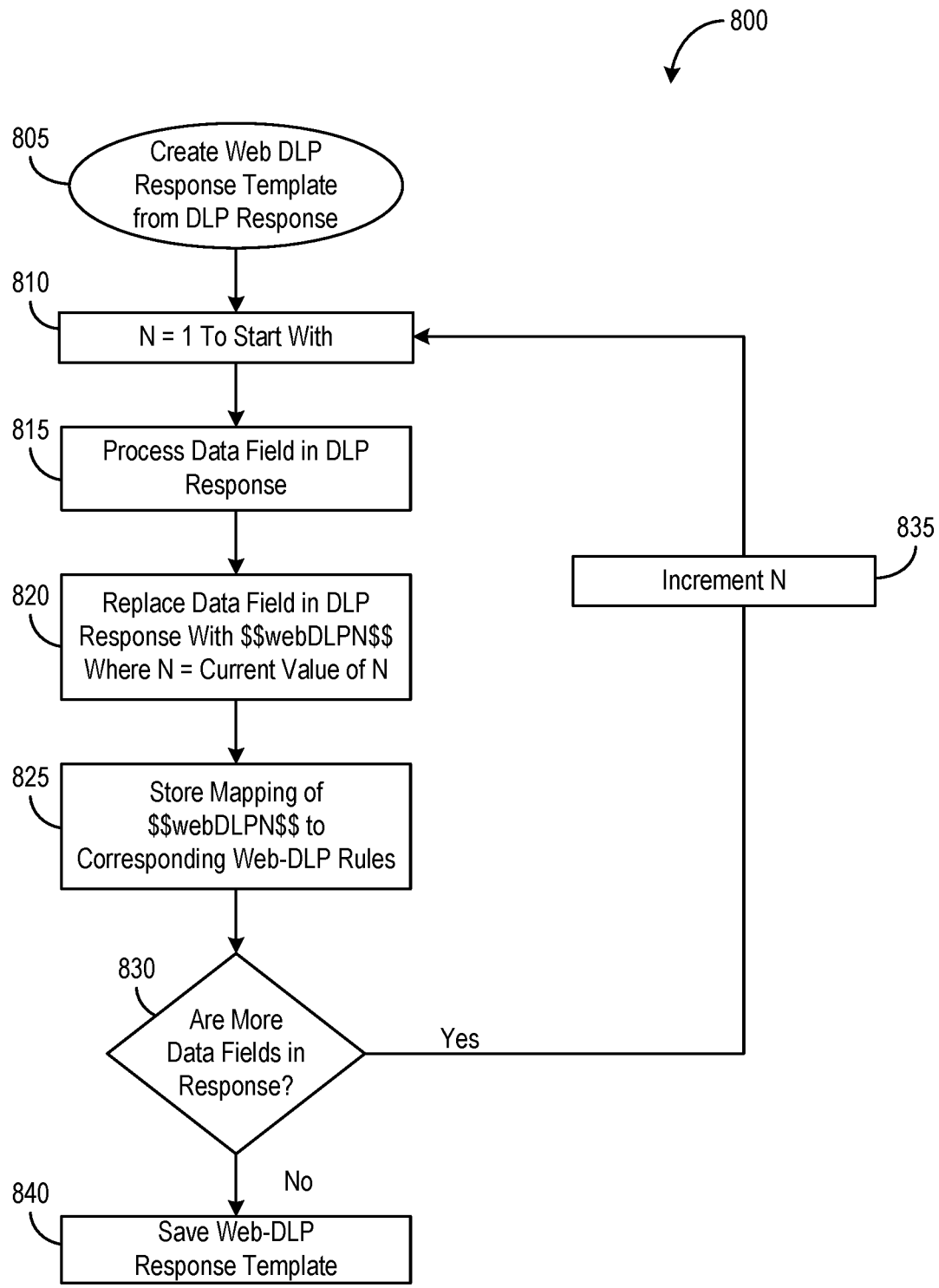
FIG. 8 is a flow diagram of a method of generating response templates in accordance with an illustrative embodiment.

Referring now to FIG. 8, depicted is a flow diagram of a method 800 of generating response templates. The functionalities of method 800 may be implemented using, or performed by, the components described in FIGS. 1-6C, such as the appliance 200, the adaptor engine 505, and the DLP service 510. As illustrated, an adaptor engine (e.g., the adaptor engine 505) may create a web DLP response template (e.g., the template 545') from a DLP response (e.g., the DLP output 625) (805). The adaptor engine may start from N=1 for a count of the data field (810). The adaptor engine may process the data field in the DLP response (815). The adaptor engine may replace the data field in the DLP response with "$$webDLPN$$" where "N" corresponds to current value of N (820). The adaptor engine may store a mapping of "$$webDLPN$$" to the corresponding web-DLP rules (e.g., the rules 540') (825). The adaptor engine may determine whether there are more data fields in the response (830). When there are more data fields in the response, the adaptor engine may increment N to identify the next data field (835), and may repeat the operations in (810)-(830). Conversely, when there are no more data fields in the response, the adaptor engine may save the web DLP response template (840).

Figure 9:
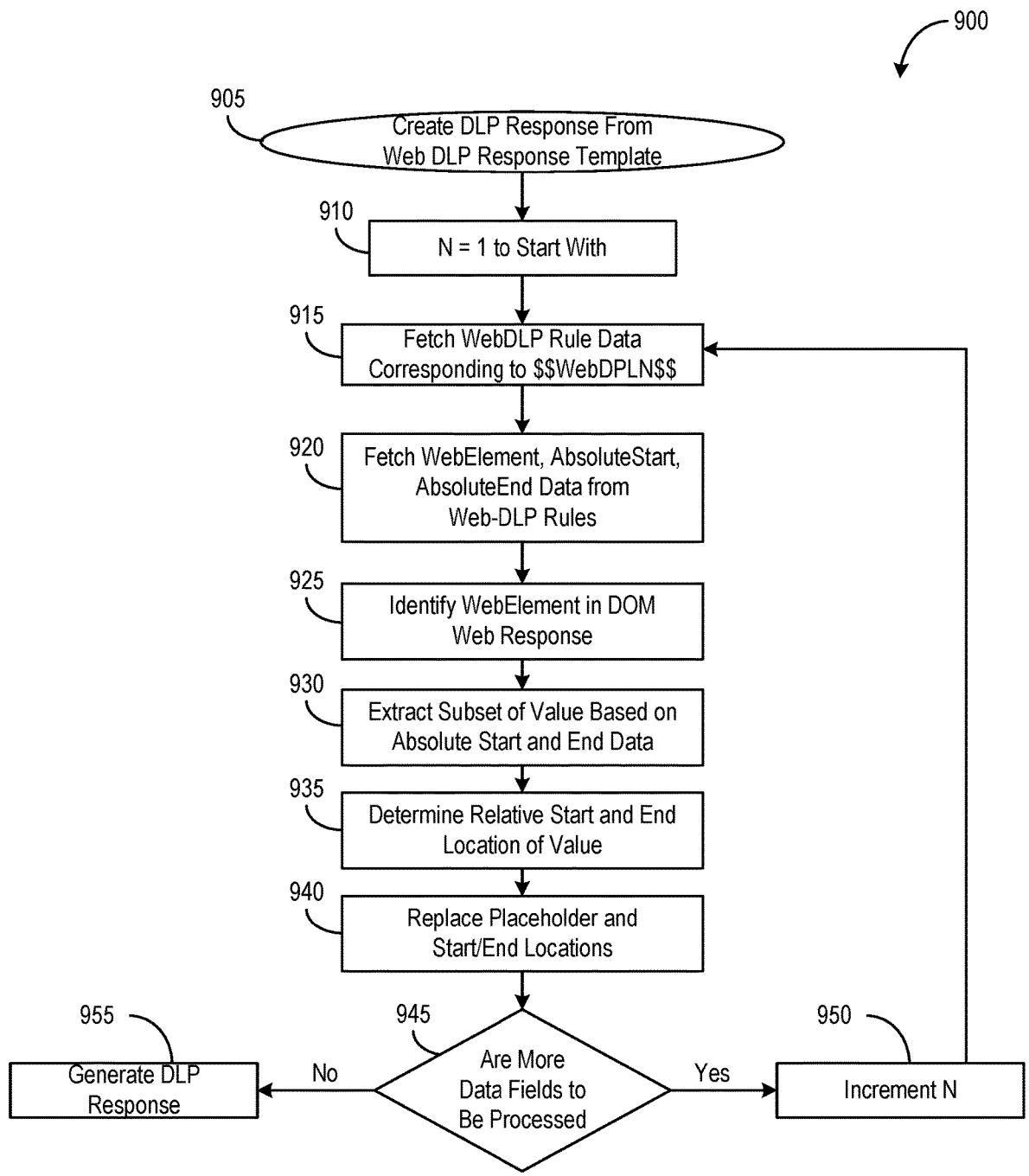
FIG. 9 is a flow diagram of a method of generating DLP responses in accordance with an illustrative embodiment.

Referring now to FIG. 9, depicted is a flow diagram of a method 900 of generating DLP responses. The functionalities of method 900 may be implemented using, or performed by, the components described in FIGS. 1-6C, such as the appliance 200, the adaptor engine 505, and the DLP service 510. As illustrated, an adaptor engine (e.g., the adaptor engine 505) may create a DLP response (e.g., the DLP response 645) from a web-DLP response template (e.g., the template 545) (905). The adaptor engine may start from N=1 for a count of the data field (910). The adaptor engine may fetch web DLP rule data (e.g., the rule 540) corresponding to "$$webDLPN$$" where "N" corresponds to current value of N (915). The adaptor engine may fetch a web element, an absolute start, and absolute end data from the web DLP rules (920). The adaptor engine may identify the web element in the DOM web response (e.g., the web response 610) (925). The adaptor engine may extract a subset of values based on the absolute start and end data (930). The adaptor engine may determine a relative start and end location of value (935). The adaptor engine may replace a placeholder and start and end locations (940). The adaptor engine may determine whether there are any more data fields to be processed (945). If there are more data fields to be processed, the adaptor engine may increment N to identify the next data field (950). Otherwise, if there are no more data fields to be processed, the adaptor engine may generate the DLP response (955).

Figure 10:
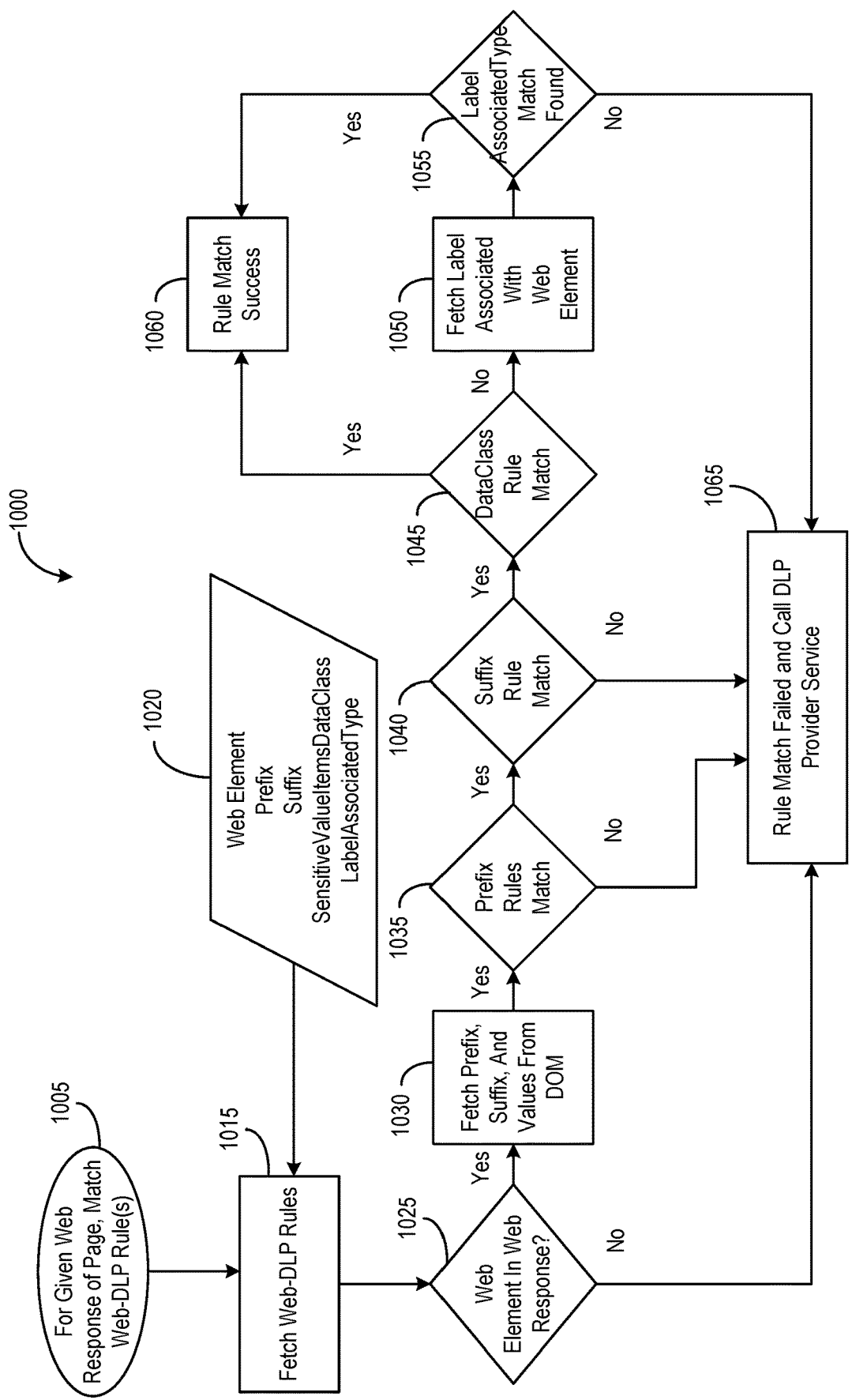
FIG. 10 is a flow diagram of a method of matching against elements in web responses in accordance with an illustrative embodiment.

Referring now to FIG. 10, depicted is a flow diagram of a method 1000 of matching against elements in web responses. The functionalities of method 1000 may be implemented using, or performed by, the components described in FIGS. 1-6C, such as the appliance 200, the adaptor engine 505, and the DLP service 510. As illustrated, an adaptor engine (e.g., the adaptor engine 505) may match one or more web DLP rules (e.g., the rules 540) for a given web response (e.g., the web response 610) (1005). The adaptor engine may fetch web-DLP rules (1015). Web DLP rules may define or specify a web element, a prefix, a suffix, a sensitive value items data class, and label associated type, among others (1020).

The adaptor engine may determine whether a web element (e.g., a DOM object) is in the web response (1025). If the web element is determined to be in the web response, the adaptor engine may fetch the prefix, suffix, and values from the web element (1030). The adaptor engine may determine whether the prefix matches the rule (1035). If the prefix is determined to match, the adaptor engine may determine whether the suffix matches the rule (1040). If the suffix is determined to match, the adaptor engine may determine whether the data class matches the rule (1045). If the data class is determined to not match, the adaptor engine may fetch the label associated with the web element (1050). The adaptor engine may determine whether the label associated type is found in the rule (1055).

When data class is determined to match the rule or when the label associated type is determined to be found in the rule, the adaptor engine may determine a rule match success (also referred herein as a complete match) (1060). In contrast, when at least one of the specifications of the rule is determined to not match, the adaptor engine may determine that the rule match has failed (also referred herein as an incomplete match) (1065). For example, the determination of the failure may be when the web element is determined to be not in the response, when the prefix is determined to not match the prefix, when the suffix is determined to not match the suffix, or when the label associated type is determined to be not found. Additionally, the adaptor engine may call a DLP service (e.g., the DLP service 510).

Figure 11:
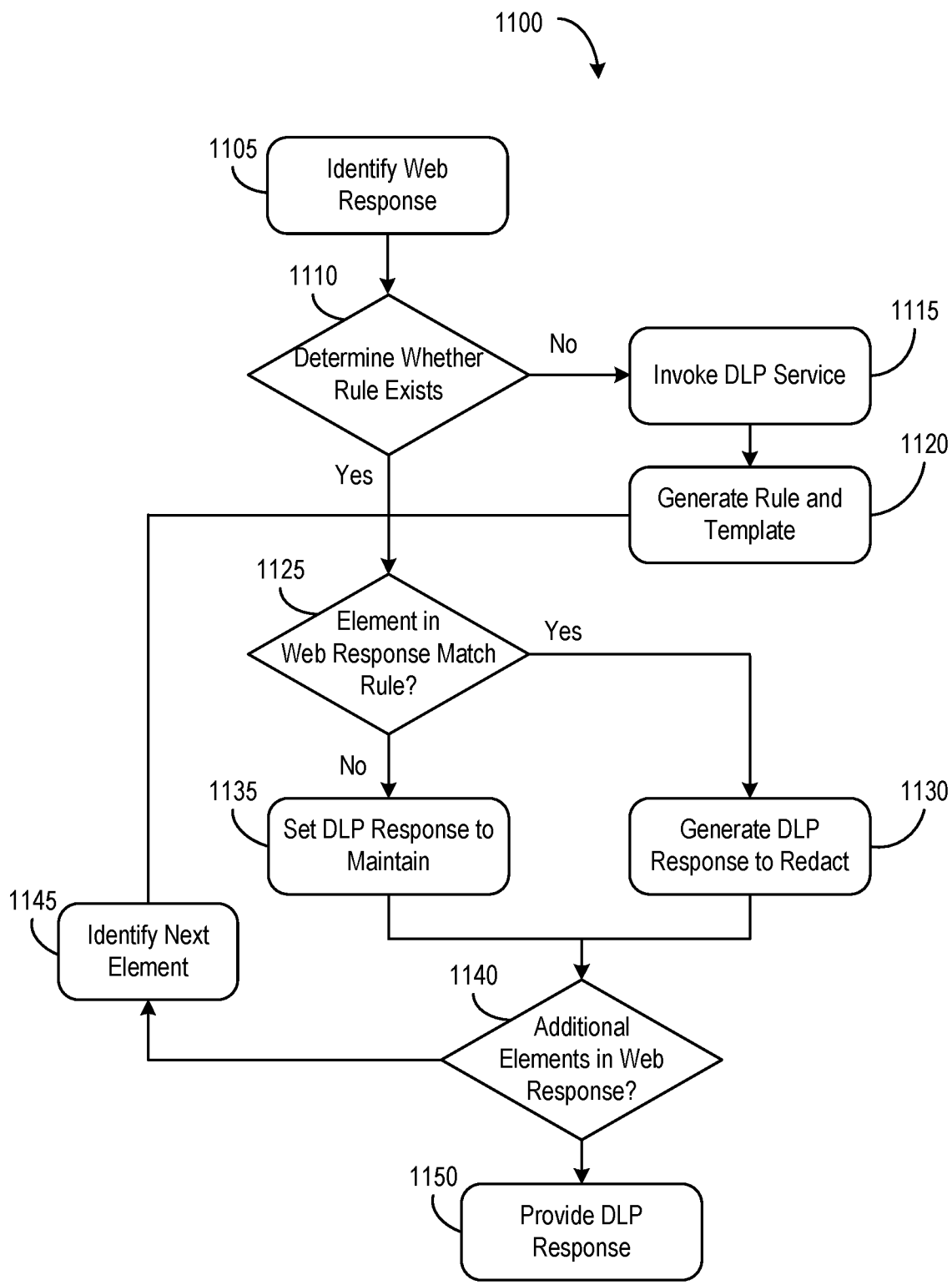
FIG. 11 is a flow diagram of a method of adaptive data loss prevention (DLP) using rules and templates for responses in accordance with an illustrative embodiment.

Referring now to FIG. 11, depicted is a flow diagram of a method 1100 of adaptive data loss prevention (DLP) using rules and templates for responses. The functionalities of method 1100 may be implemented using, or performed by, the components described in FIGS. 1-6C, such as the appliance 200, the adaptor engine 505, and the DLP service 510. In brief overview, an adaptor engine may identify a web response (1105). The adaptor engine may determine whether a rule exists for the web response (1110). When no rule is determined to exist, the adaptor engine may invoke a DLP service (1115). The adaptor engine may generate a rule and a template (1120). The adaptor engine may determine whether an element in the web response matches the rule (1125). If determined to match, the adaptor engine may generate a DLP response to redact the element (1130). If determined to not match, the adaptor engine may set the DLP response to maintain (1135). The adaptor engine may determine whether additional elements exist in the web response (1140). If determined to exist, the adaptor engine may identify a next element (1145). The adaptor engine may provide the DLP response (1150).

In further detail, an adaptor engine (e.g., the adaptor engine 505) may receive or otherwise identify a web response (e.g., the web response 610) (1105). The web response may be received from a server (e.g., the server 106) in response a request from a client (e.g., the client 102) to access a resource. The web response may include data (e.g., the data 615). The data may include one or more elements (e.g., the elements 620). At least a portion of the data (and by extension, the elements) may include or correspond to sensitive information.

The adaptor engine may determine whether a rule (e.g., the rule 540) exists for the web response (1110). To determine existence of a rule, the adaptor engine may identify an address referencing the web response. Using the address, the adaptor may access a database (e.g., the database 535) to find one or more rules corresponding to the rule. When found in the database, the adaptor engine may determine that at least one rule exists for the web response. Conversely, when not found in the database, the adaptor engine may determine that no rules exist for the web response.

When no rule is determined to exist, the adaptor engine may invoke a DLP service (e.g., the DLP service 510) (1115). In invoking, the adaptor engine may forward the web response to the DLP service. Upon receipt, the DLP service may use the web response to generate at least one DLP output (e.g., the DLP output 625). The DLP output may identify the sensitive content (e.g., the sensitive content 630) in the data of the web response. For pieces of sensitive content, the DLP output may identify a location (e.g., the location 635). In some embodiments, the adaptor engine may determine whether the DLP service is available prior to invoking. The DLP service may provide the DLP output to the adaptor engine.

The adaptor engine may generate a rule (e.g., the rule 540') and a template (e.g., the template 545') (1120). The generation of the rule and the template may be based on the DLP output from the DLP service and the web response from the server. From parsing the DLP output, the adaptor engine may identify the sensitive content and the location for the sensitive content. The adaptor engine may convert the data of the web response to elements for the rule. For the elements, the rule may define one or more specification. In addition, the adaptor engine may replace the sensitive content with a placeholder (e.g., the placeholder 630') to generate the template corresponding to the rule.

The adaptor engine may determine whether the element in the web response matches the rule (1125). The adaptor engine may compare the element corresponding to the sensitive information in the data of the web response with the rule to determine the match. For specifications of the rule, the adaptor engine may determine whether the corresponding attribute of the element of the data is in compliance. When all are determined to be in compliance, the adaptor engine may determine that the element matches the rule. Otherwise, when at least one is determined to be in noncompliance, the adaptor engine may determine that the element does not match.

If determined to match, the adaptor engine may generate a DLP response (e.g., the DLP response 645) to redact (1130). The DLP response may be used instead of the DLP output from the DLP service for the web response. The adaptor engine may identify the template corresponding to the rule. In the template, the adaptor engine may identify the one or more placeholders. For the placeholders, the adaptor engine may replace with the corresponding sensitive content in the data of the web response. The DLP response may alter or redact the portion of the data determined to be matched with the rule. If determined to not match, the adaptor engine may set the DLP response to maintain (1135). The adaptor engine may set the DLP response to maintain the portion of the data determined to be not matched with the rule. The adaptor engine may determine whether additional elements exist in the web response (1140). If determined to exist, the adaptor engine may identify a next element (1145). Otherwise, if determined to not exist, the adaptor engine may provide the DLP response (1150). In some embodiments, the adaptor engine may apply the DLP response to the data of the web response.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method comprising:
   receiving, by a first computing device, (i) a first response from a server generated responsive to a first request from one of a plurality of clients and (ii) a first data loss prevention (DLP) output from a second computing device to modify the first response to be sent to one of the plurality of clients, the first DLP output identifying sensitive data to be redacted from the first response;
   generating, by the first computing device, according to the first response and the first DLP output, at least one rule regarding the sensitive data and at least one template for redacting the sensitive data in responses;
   determining, by the first computing device according to the at least one rule, a match to a second response from the server generated responsive to a second request from one of the plurality of clients, that includes the sensitive data;
   generating, by the first computing device responsive to the match, a third response to redact the sensitive data from the second response in accordance with the at least one template; and
   providing, by the first computing device, the third response to the one of the plurality of clients, instead of using a second DLP output of the second computing device identifying the sensitive data to redact from the second response.

2. The method of claim 1, wherein the sensitive data includes a class or type of content.

3. The method of claim 1, comprising:
   converting, by the first computing device, the sensitive data into an identifiable user interface element, wherein the at least one rule is configured to match with the identifiable user interface element.

4. The method of claim 3, wherein the identifiable user interface element includes at least one of: a prefix, a suffix, a label, a length or number of characters of the sensitive data, a type of characters of the sensitive data, or at least one location values.

5. The method of claim 1, wherein the third response redacts or indicates to redact the sensitive data of the second response, according to the at least one rule.

6. The method of claim 1, comprising:
   determining, by the first computing device according to a first rule of the at least one rule, a complete match with a first data in the second response;
   determining, by the first computing device according to a second rule of the at least one rule, a complete match with a second data in the second response; and
   providing, by the first computing device according to the complete match with the first data, the complete match with the second match, and the at least one template, the third response to redact the first data and the second data of the second response.

7. The method of claim 1, comprising:
   determining, by the first computing device according to a first rule of the at least one rule, a complete match with a first data in the second response;
   determining, by the first computing device according to a second rule of the at least one matching rule, an incomplete match with a second data in the second response; and
   providing, by the first computing device according to the complete match, the incomplete match and the at least one template, the third response to redact the first data and to maintain the second data of the second response.

8. The method of claim 7, comprising:
   identifying, by the first computing device, a first template from the at least one template, that corresponds to the complete match with the first data; and
   providing, by the first computing device according to the first template, the third response to redact the first data and to maintain the second data of the second response.

9. A device, comprising:
   at least one processor configured to:
   receive (i), a first response from a server generated responsive to a first request from one of a plurality of clients and (ii) a first data loss prevention (DLP) output from a second computing device to modify the first response to be sent to one of the plurality of clients, the first DLP output identifying sensitive data to be redacted from the first response;
   generate, according to the first response and the first DLP output, at least one rule regarding the sensitive data and at least one template for redacting the sensitive data in responses;
   determine, according to the at least one rule, a match to a second response from the server generated responsive to a second request to one of the plurality of clients, that includes the sensitive data;
   generate, responsive to the match, a third response to redact the sensitive data from the second response in accordance with the at least one template; and
   provide third response to the client, instead of using a second DLP output of the second computing device identifying the sensitive data to redact from the second response.

10. The device of claim 9, wherein the sensitive data includes a class or type of content.

11. The device of claim 9, wherein the at least one processor is configured to:
convert the sensitive data into an identifiable user interface element, the at least one rule configured to match with the identifiable user interface element.

12. The device of claim 11, wherein the identifiable user interface element includes at least one of: a prefix, a suffix, a label, a length or number of characters of the sensitive data, a type of characters of the sensitive data, or at least one location values.

13. The device of claim 9, wherein the third response redacts or indicates to redact the sensitive data of the second response, according to the at least one rule.

14. The device of claim 9, wherein the at least one processor is configured to:
determine, according to a first rule of the at least one rule, a complete match with a first data in the second response;
determine, according to a second rule of the at least one rule, an incomplete match with a second data in the second response; and
provide, according to the complete match, the incomplete match and the at least one template, the third response to redact the first data and to maintain the second data of the second response.

15. A non-transitory computer readable medium storing program instructions for causing at least one processor to:
receive (i) a first response from a server generated responsive to a first request from one of a plurality of clients and (ii) a first data loss prevention (DLP) output from a computing device to modify the first response to be sent to one of the plurality of clients, the first DLP output identifying sensitive data to be redacted from the first response;
generate, according to the first response and the first DLP output, at least one rule regarding the sensitive data and at least one template for redacting the sensitive data in responses;
determine, according to the at least one rule, a match to a second response from the server generated responsive to a second request from one of the plurality of clients, that includes the sensitive data;
generate, responsive to the match, a third response to redact the sensitive data from the second response in accordance with the at least one template; and
provide third response to the one of the plurality of clients, instead of using a second DLP output of the computing device identifying the sensitive data to redact from the second response.

16. The non-transitory computer readable medium of claim 15, wherein the sensitive data includes a class or type of content.

17. The non-transitory computer readable medium of claim 15, wherein the program instructions cause the at least one processor to:
convert the sensitive data into an identifiable user interface element, the at least one rule configured to match with the identifiable user interface element.

18. The non-transitory computer readable medium of claim 17, wherein the identifiable user interface element includes at least one of: a prefix, a suffix, a label, a length or number of characters of the sensitive data, a type of characters of the sensitive data, or at least one location values.

19. The non-transitory computer readable medium of claim 15, wherein the third response redacts or indicates to redact the sensitive data of the second response, according to the at least one rule.

20. A method, comprising:
receiving, by a first computing device, (i) a first response from a server in response to a first request from one of a plurality of clients and (ii) a first data loss prevention (DLP) output from a second computing device for modifying the first response to be sent to one of the plurality of clients, the first DLP output identifying sensitive data to be redacted from the first response;
generating, by the first computing device, according to the first response and the first DLP output, at least one rule regarding the sensitive data and at least one template for redacting the sensitive data in responses;
receiving, by the first computing device, a second response from the server hosting a web application to display a first page of content in response to a second request from one of a plurality of clients;
identifying, by the first computing device, data of the second response that includes sensitive data according to the at least one rule;
generating, by the first computing device, an element displayable on the page in response to the identification of the data of the received second response according to the at least one template, the element identifiable based at least on the at least one rule and including non-sensitive data; and
applying, by the first computing device, the generated element to at least one subsequent response for display of a second page to provide to one of the plurality of clients, the application of the generated element to prevent loss of sensitive information caused by display of the second page, instead of using a second DLP output from the second computing device identifying sensitive data to redact from the second response.

* * * * *